United States Patent
Sjöberg et al.

(10) Patent No.: US 12,200,265 B2
(45) Date of Patent: Jan. 14, 2025

(54) OUTPUT PROCESS DISABLE INDICATOR

(71) Applicant: Telefonaktiebolaget LM Ericsson (publ), Stockholm (SE)

(72) Inventors: Rickard Sjöberg, Stockholm (SE); Mitra Damghanian, Upplands-Bro (SE); Martin Pettersson, Vallentuna (SE); Davood Saffar, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 140 days.

(21) Appl. No.: 17/786,035

(22) PCT Filed: Dec. 11, 2020

(86) PCT No.: PCT/EP2020/085723
§ 371 (c)(1),
(2) Date: Jun. 16, 2022

(87) PCT Pub. No.: WO2021/122365
PCT Pub. Date: Jun. 24, 2021

(65) Prior Publication Data
US 2023/0362412 A1    Nov. 9, 2023

Related U.S. Application Data

(60) Provisional application No. 62/950,493, filed on Dec. 19, 2019.

(51) Int. Cl.
*H04N 19/70* (2014.01)
*H04N 19/172* (2014.01)
*H04N 19/46* (2014.01)

(52) U.S. Cl.
CPC ........... *H04N 19/70* (2014.11); *H04N 19/172* (2014.11); *H04N 19/46* (2014.11)

(58) Field of Classification Search
CPC ...... H04N 19/172; H04N 19/40; H04N 19/44; H04N 19/46; H04N 19/70; H04N 19/80; H04N 19/85
(Continued)

(56) References Cited

U.S. PATENT DOCUMENTS

| 2007/0201813 A1 | 8/2007 | Onoda |
| 2013/0188733 A1 | 7/2013 | Van Der Auwera et al. |

(Continued)

FOREIGN PATENT DOCUMENTS

| CN | 104054339 A | 9/2014 | |
| CN | 104521235 A * | 4/2015 | ............. H04N 19/42 |

(Continued)

OTHER PUBLICATIONS

Benjamin Bross, Versatile video coding, draft 7, Jan. 11, 2019, pp. 1-491.*
International Search Report and Written Opinion of the International Searching Authority, PCT/EP2020/085723, mailed May 21, 2021, 25 pages.
Bross, et al. "Versatile Video Coding (Draft 7)," Joint Video Experts Team (JVET) of ITU-T SG 16 WP 3 and ISO/IEC JTC 1/SC 29/WG 11, Oct. 1-11, 2019, Geneva, Switzerland, 258 pages.

(Continued)

*Primary Examiner* — Behrooz M Senfi
(74) *Attorney, Agent, or Firm* — Sage Patent Group

(57) ABSTRACT

A decoder can receive a bitstream. The bitstream can include at least one output process syntax element for configuring an output process. The decoder can determine that the output process is disabled. The decoder can decode a current picture from the bitstream. The decoder can, responsive to determining that the output process is disabled, output the current picture as an output picture.

20 Claims, 13 Drawing Sheets

| nal_unit_header() { | Descriptor |
|---|---|
| forbidden_zero_bit | f(1) |
| nal_unit_type | u(6) |
| nuh_layer_id | u(6) |
| nuh_temporal_id_plus1 | u(3) |
| } | |

(58) Field of Classification Search
USPC .................................................... 375/240.26
See application file for complete search history.

(56) References Cited

U.S. PATENT DOCUMENTS

| | | | | |
|---|---|---|---|---|
| 2014/0086336 A1* | 3/2014 | Wang | ..................... | H04N 19/44 375/240.26 |
| 2017/0359590 A1* | 12/2017 | Zhang | .................. | H04N 19/423 |
| 2022/0264153 A1* | 8/2022 | Deshpande | .......... | H04N 19/187 |

FOREIGN PATENT DOCUMENTS

| | | |
|---|---|---|
| CN | 104641648 A | 5/2015 |
| CN | 109952577 A | 6/2019 |
| WO | WO-2020188273 A1 * 9/2020 ........... H04N 19/107 |

OTHER PUBLICATIONS

Sjoberg, et al. "Mandatory film grain," Joint Video Experts Team (JVET) of ITU-T SG 16 WP 3 and ISO/IEC JTC 1/SC 29/WG 11, Jan. 7-17, 2020, Brussels, Belgium, 6 pages.

Office Action mailed Mar. 22, 2024 for Chinese Patent Application No. 202080093326.7, 13 pages.

Chinese Office Action, Chinese Patent Application No. 202080093326.7, mailed Aug. 9, 2024, 11 pages.

Boyce, et al., "Video usability information and supplemental enhancement information for coded video bitstreams (Draft 2)", Joint Video Experts Team (JVET) of ITU-T SG 16 WP 3 and ISO/IEC JTC 1/SC 29/WG 11, 16th Meetingm Geneva, CH, Oct. 1-11, 2019, 88 pages.

* cited by examiner

| nal_unit_header() { | Descriptor |
|---|---|
| forbidden_zero_bit | f(1) |
| nal_unit_type | u(6) |
| nuh_layer_id | u(6) |
| nuh_temporal_id_plus1 | u(3) |
| } | |

FIG. 1

| nal_unit_header() { | Descriptor |
|---|---|
| forbidden_zero_bit | f(1) |
| nuh_reserved_zero_bit | u(1) |
| nuh_layer_id | u(6) |
| nal_unit_type | u(5) |
| nuh_temporal_id_plus1 | u(3) |
| } | |

FIG. 2

| nal_unit_type | Name of nal_unit_type | Content of NAL unit and RBSP syntax structure | NAL Unit Type Class |
|---|---|---|---|
| 0 | TRAIL_NUT | Coded slice of a trailing picture slice_layer_rbsp() | VCL |
| 1 | STSA_NUT | Coded slice of an STSA picture slice_layer_rbsp() | VCL |
| 2 | RADL_NUT | Coded slice of a RADL picture slice_layer_rbsp() | VCL |
| 3 | RASL_NUT | Coded slice of a RASL picture slice_layer_rbsp() | VCL |
| 4..6 | RSV_VCL_4.. RSV_VCL_6 | Reserved non-IRAP VCL NAL unit types | VCL |
| 7 8 | IDR_W_RADL IDR_N_LP | Coded slice of an IDR picture slice_layer_rbsp() | VCL |
| 9 | CRA_NUT | Coded slice of a CRA picture slice_layer_rbsp() | VCL |
| 10 | GDR_NUT | Coded slice of a GDR picture slice_layer_rbsp() | VCL |
| 11 12 | RSV_IRAP_11 RSV_IRAP_12 | Reserved IRAP VCL NAL unit types | VCL |
| 13 | DPS_NUT | Decoding parameter set decoding_parameter_set_rbsp() | non-VCL |
| 14 | VPS_NUT | Video parameter set video_parameter_set_rbsp() | non-VCL |
| 15 | SPS_NUT | Sequence parameter set seq_parameter_set_rbsp() | non-VCL |
| 16 | PPS_NUT | Picture parameter set pic_parameter_set_rbsp() | non-VCL |
| 17 18 | PREFIX_APS_NUT SUFFIX_APS_NUT | Adaptation parameter set adaptation_parameter_set_rbsp() | non-VCL |
| 19 | PH_NUT | Picture header picture_header_rbsp() | non-VCL |
| 20 | AUD_NUT | AU delimiter access_unit_delimiter_rbsp() | non-VCL |
| 21 | EOS_NUT | End of sequence end_of_seq_rbsp() | non-VCL |
| 22 | EOB_NUT | End of bitstream end_of_bitstream_rbsp() | non-VCL |
| 23 24 | PREFIX_SEI_NUT SUFFIX_SEI_NUT | Supplemental enhancement information sei_rbsp() | non-VCL |
| 25 | FD_NUT | Filler data filler_data_rbsp() | non-VCL |
| 26 27 | RSV_NVCL_26 RSV_NVCL_27 | Reserved non-VCL NAL unit types | non-VCL |
| 28..31 | UNSPEC_28.. UNSPEC_31 | Unspecified non-VCL NAL unit types | non-VCL |

FIG. 3

| adaptation_parameter_set_rbsp() { | Descriptor |
|---|---|
|    adaptation_parameter_set_id | u(5) |
|    aps_params_type | u(3) |
|    if( aps_params_type = = ALF_APS ) | |
|       alf_data( ) | |
|    else if( aps_params_type = = LMCS_APS ) | |
|       lmcs_data( ) | |
|    else if( aps_params_type = = SCALING_APS ) | |
|       scaling_list_data( ) | |
|    aps_extension_flag | u(1) |
|    if( aps_extension_flag ) | |
|       while( more_rbsp_data( ) ) | |
|          aps_extension_data_flag | u(1) |
|    rbsp_trailing_bits( ) | |
| } | |

| film_grain_characteristics(payloadSize) { | Type |
|---|---|
|     film_grain_characteristics_cancel_flag | u(1) |
|     if ( !film_grain_characteristics_cancel_flag ) { | |
|         film_grain_mode_id | u(2) |
|         separate_colour_description_present_flag | u(1) |
|         if (separate_colour_description_present_flag) { | |
|             color_specific_parameters() | |
|         } | |
|         more_film_grain_parameters( ) | |
|         film_grain_characteristics_persistence_flag | u(1) |
| } | |

FIG. 9

| film_grain_params() { | Type |
|---|---|
|     if ( !film_grain_params_present || (!show_frame && !showable_frame)) { | |
|         reset_grain_params() | |
|         return | |
|     } | |
|     apply_grain | f(1) |
|     if ( !apply_grain) { | |
|         reset_grain_params() | |
|         return | |
|     } | |
|     grain_seed | f(16) |
|     if ( frame_type == INTER_FRAME ) | |
|         update_grain | f(1) |
|     else | |
|         update_grain = 1 | |
|     if ( !update_grain ) { | |
|         film_grain_params_ref_idx | f(3) |
|         tempGrainSeed = grain_seed | |
|         load_grain_params( film_grain_params_ref_idx ) | |
|         grain_seed = tempGrainSeed | |
|         return | |
|     } | |
|     more_film_grain_parameters( ) | |
| } | |

FIG. 10

| Combination | Output process enable indicator | Output process disable indicator | Meaning |
|---|---|---|---|
| 1 | enable | disable (V1) | output process syntax elements present but output process not executed |
| 2 | enable | not disabled (V2) | output process syntax elements present and output process executed |
| 3 | disable | disable (V1) | output process syntax elements not present and output process not executed |
| 4 | disable | not disabled (V2) | output process syntax elements not present and output process not executed |

FIG. 11

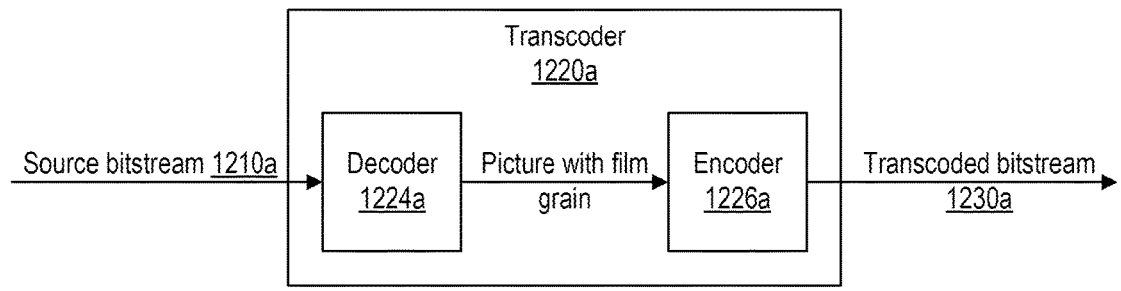

FIG. 12A

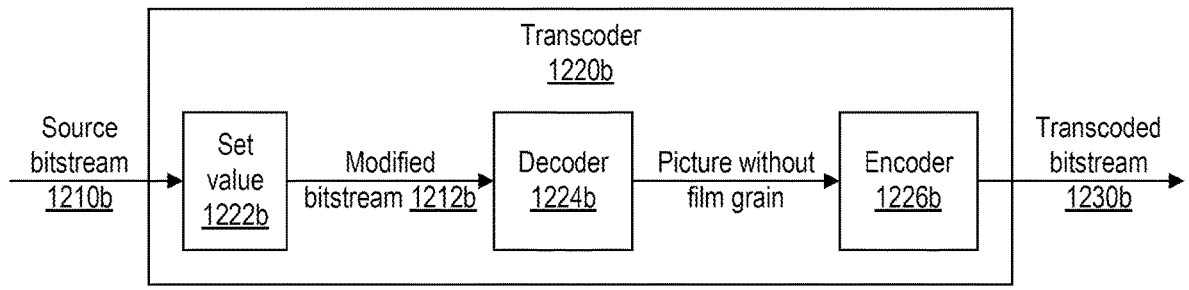

FIG. 12B

| adaptation_parameter_set_rbsp( ) { | Descriptor |
|---|---|
|     adaptation_parameter_set_id | u(5) |
|     aps_params_type | u(3) |
|     if( aps_params_type = = 3 ) | |
|         output_processl_syntax_elements( ) | |
|     ... | |
| } | |

FIG. 16

| picture_header_rbsp( ) or slice_header( ) { | Descriptor |
|---|---|
|     ... | |
|     if( output_process_enable_flag ) { | |
|         output_process_aps_id | u(3) |
|     } | |
| ... | |

FIG. 17

OUTPUT PROCESS DISABLE INDICATOR

CROSS REFERENCE TO RELATED APPLICATIONS

This application is a 35 U.S.C. § 371 national stage application of PCT International Application No. PCT/EP2020/085723 filed on Dec. 11, 2020, which in turn claims priority to United Statues Provisional Patent Application No. 62/950,493 filed on Dec. 19, 2019, the disclosures and content of which are incorporated by reference herein in their entireties.

TECHNICAL FIELD

The present disclosure relates generally to communications, and more particularly to communication methods and related devices and nodes supporting wireless communications.

BACKGROUND

High Efficiency Video Coding ("HEVC") is a block-based video codec standardized by the International Telecommunication Union-Telecommunication ("ITU-T") and the Moving Picture Expert Group ("MPEG") that uses both temporal and spatial prediction. Spatial prediction can be achieved using intra ("I") prediction from within the current picture. Temporal prediction can be achieved using uni-directional ("P") or bi-directional inter ("B") prediction on block level from previously decoded reference pictures. In an encoder, the difference between the original pixel data and the predicted pixel data, referred to as the residual, can be transformed into the frequency domain, quantized, and then entropy coded before being transmitted together with necessary prediction parameters such as prediction mode and motion vectors, which can also be entropy coded. A decoder performs entropy decoding, inverse quantization, and inverse transformation to obtain the residual, and then adds the residual to an intra or inter prediction to reconstruct a picture.

MPEG and ITU-T are working on the successor to HEVC within the Joint Video Exploratory Team ("JVET"). The name of this video codec under development is Versatile Video Coding ("VVC").

A video sequence can include a series of images where each image includes one or more components. Each component can be described as a two-dimensional rectangular array of sample values. An image in a video sequence can include three components: one luma component Y, where the sample values are luma values; and two chroma components, Cb and Cr, where the sample values are chroma values. The dimensions of the chroma components can be smaller than the luma components by a factor of two in each dimension. For example, the size of the luma component of an HD image can be 1920×1080 and the chroma components can each have the dimension of 960×540. Components are sometimes referred to as color components.

A block is one two-dimensional array of samples. In video coding, each component can be split into blacks and the coded video bitstream includes a series of coded blocks. In video coding, an image can be split into units that cover a specific area of the image, Each unit includes all blocks from all components that make up that specific area and each block belongs fully to one unit. The macroblock in H.264 and the Coding unit ("CU") in HEVC are examples of units.

A block can alternatively be defined as a two-dimensional array that a transform used in coding is applied to. These blocks can be referred to as "transform blocks." Alternatively, a block can be defined as a two-dimensional array that a single prediction mode is applied to. These blocks can be referred to as "prediction blocks." In this disclosure, the word block may not be tied to one of these definitions, instead the descriptions herein can apply to either definition.

A residual block can include samples that represent sample value differences between sample values of the original source blocks and the prediction blocks. The residual block can be processed using a spatial transform. In an encoder, the transform coefficients can be quantized according to a quantization parameter ("QP"), which can control the precision of the quantized coefficients. The quantized coefficients can be referred to as residual coefficients. A high QP value can result in low precision of the coefficients and thus low fidelity of the residual block. A decoder can receive the residual coefficients, apply inverse quantization and inverse transform to derive the residual block.

SUMMARY

According to some embodiments, a method performed by a decoder is provided. The method includes receiving a bitstream. The bitstream can include at least one output process syntax element for configuring an output process. The method further includes determining that the output process is disabled. The method further includes decoding a current picture from the bitstream. The method further includes, responsive to determining that the output process is disabled, outputting the current picture as an output picture.

According to other embodiments, a method performed by a bitstream modification entity is provided. The method includes receiving an input bitstream including an output process disable indicator. The method can further include generating an output bitstream from the input bitstream by copying or forwarding all coded data of the input bitstream except for the coded data representing an output process disable indicator. The method can further include setting the output process disable indicator in the output bitstream to a value that indicates that an output process is disabled. The at least one output process syntax element is present in the input bitstream and copied or forwarded to the output bitstream.

According to other embodiments, a method performed by a decoder is provided. The method can include receiving an input bitstream. The method can include determining whether an output process is disabled. The method can further include determining a size of an allocation for a decoded picture buffer, DPB, based on whether the output process is disabled.

According to other embodiments, a method performed by an encoder is provided for encoding a current picture into a bitstream. The method includes determining an output process disable indicator value, the output process disable indicator value indicating whether an output process is disabled. The method can further include determining an output process enable indicator value, separate from the output process disable indicator value, the output process enable value specifying whether at least one output process syntax element is present in the bitstream wherein the at least one output process, syntax element comprising instructions for configuring the output process. The method can further include encoding the output process disable indicator value into the bitstream. The method can further include encoding the output process enable indicator value into the bitstream. The method can further include encoding the current picture into the bitstream.

According to other embodiments, a decoder is provided. The decoder can include processing, circuitry and memory coupled with the processing circuitry. The memory includes instructions that when executed by the processing circuitry causes the decoder to receive a bitstream. The bitstream comprising at least one output process syntax element for configuring an output process. The instructions can further cause the decoder to determine that the output process is disabled. The instructions can further cause the decoder to decode a current picture from the bitstream. The instructions can further cause the decoder to, responsive to determining that the output process is disabled, output (2160) the current picture as an output picture.

According to other embodiments, a bitstream modification entity is provided. The bitstream modification entity can include processing circuitry and memory coupled with the processing circuitry. The memory includes instructions that when executed by the processing circuitry causes the bitstream modification entity to receive an input bitstream comprising an output process disable indicator. The instructions can further cause the bitstream modification entity to generate an output bitstream from the input bitstream by copying or forwarding all coded data of the input bitstream except for the coded data representing an output process disable indicator. The instructions can further cause the bitstream modification entity to set the output process disable indicator in the output bitstream to a value that indicates that an output process is disabled. The at least one output process syntax element is present in the input bitstream and copied or forwarded to the output bitstream.

According to other embodiments, a decoder is provided. The decoder can include processing circuitry and memory coupled with the processing circuitry. The memory includes instructions that when executed by the processing circuitry causes the decoder to receive an input bitstream. The instructions can further cause the decoder to determine whether an output process is disabled. The instructions can further cause the decoder to determine a size of an allocation for a decoded picture buffer, DPB, based on whether the output process is disabled.

According to other embodiments, an encoder is provided. The encoder can include processing circuitry and memory coupled with the processing circuitry. The memory includes instructions that when executed by the processing circuitry causes the encoder to determine an output process disable indicator value, the output process disable indicator value indicating whether an output process is disabled. The instructions can further cause the encoder to determine an output process enable indicator value, separate from the output process disable indicator value, the output process enable value specifying whether at least one output process syntax element is present in the bitstream wherein the at least one output process syntax element comprising instructions for configuring the output process. The instructions can further cause the encoder to encode the output process disable indicator value into the bitstream. The instructions can further cause the encoder to encode the output process enable indicator value into the bitstream. The instructions can further cause the encoder to encode the current picture into the bitstream.

According to other embodiments, a computer program is provided including program code to be executed by processing circuitry of a decoder. Execution of program code causes the decoder to receive a bitstream. The bitstream comprising at least one output process syntax element for configuring an output process. The program code can further cause the decoder to determine that the output process is disabled. The program code can further cause the decoder to decode a current picture from the bitstream. The program code can further cause the decoder to, responsive to determining that the output process is disabled, output (2160) the current picture as an output picture.

According to other embodiments, a computer program is provided including program code to be executed by processing circuitry of a bitstream modification entity. Execution of program code causes the bitstream modification entity to receive an input bitstream comprising an output process disable indicator. The program code can further cause the bitstream modification entity to generate an output bitstream from the input bitstream by copying or forwarding all coded data of the input bitstream except for the coded data representing an output process disable indicator. The program code can further cause the bitstream modification entity to set the output process disable indicator in the output bitstream to a value that indicates that an output process is disabled. The at least one output process syntax element is present in the input bitstream and copied or forwarded to the output bitstream.

According to other embodiments, a computer program is provided including program, code to be executed by processing circuitry of decoder. Execution of program code causes the decoder to receive an input bitstream. The program code can further cause the decoder to determine whether an output process is disabled. The program code can further cause the decoder to determine a size of an allocation for a decoded picture buffer, DPB, based on whether the output process is disabled.

According to other embodiments, a computer program is provided including program code to be executed by processing circuitry of an encoder. Execution of program code causes the encoder to determine an output process disable indicator value, the output process disable indicator value indicating whether an output process is disabled. Execution of program code can further cause the encoder to determine an output process enable indicator value, separate from the output process disable indicator value, the output process enable value specifying whether at least one output process syntax element is present in the bitstream wherein the at least one output process syntax element comprising instructions for configuring the output process. Execution of program code can further cause the encoder to encode the output process disable indicator value into the bitstream. Execution of program code can further cause the encoder to encode the output process enable indicator value into the bitstream. Execution of program code can further cause the encoder to encode the current picture into the bitstream.

According to other embodiments, a computer program product is provided including a non-transitory storage medium including program code to be executed by processing circuitry of a decoder. Execution of program code causes the decoder to receive a bitstream. The bitstream comprising at least one output process syntax element for configuring an output process. The program code can further cause the decoder to determine that the output process is disabled. The program code can further cause the decoder to decode a current picture from the bitstream. The program code can further cause the decoder to, responsive to determining that the output process is disabled, output (2160) the current picture as an output picture.

According to other embodiments, a computer program product is provided including a non-transitory storage medium including program code to be executed by processing circuitry of a bitstream modification entity. Execution of program code causes the bitstream modification entity to receive an input bitstream comprising an output process disable indicator. The program code can further cause the bitstream modification entity to generate an output bitstream from the input bitstream by copying or forwarding all coded data of the input bitstream except for the coded data representing an output process disable indicator. The program code can further cause the bitstream modification entity to set the output process disable indicator in the output bitstream to a value that indicates that an output, process is disabled. The at least one output process syntax element is present in the input bitstream and copied or forwarded to the output bitstream.

According to other embodiments, a computer program product including a non-transitory storage medium including program code to be executed by processing circuitry of a decoder. Execution of the program code causes the decoder to receive an input bitstream. Execution of the program code can further cause the decoder to determine whether an output process is disabled. Execution of the program code can further cause the decoder to determine a size of an allocation for a decoded picture buffer, DPB, based on whether the output process is disabled.

According to other embodiments, a computer program product including a non-transitory storage medium including program code to be executed by a processing circuitry of an encoder. Execution of program code causes the encoder to determine an output process disable indicator value, the output process disable indicator value indicating whether an output process is disabled. Execution of program code can further cause the encoder to determine an output process enable indicator value, separate from the output process disable indicator value, the output process enable value specifying whether at least one output process syntax element is present in the bitstream wherein the at least one output process syntax element comprising instructions for configuring the output process. Execution of program code can further cause the encoder to encode the output process disable indicator value into the bitstream. Execution of program code can further cause the encoder to encode the output process enable indicator value into the bitstream. Execution of program code can further cause the encoder to encode the current picture into the bitstream.

According to other embodiments, a non-transitory computer-readable medium is provided having instructions stored therein that are executable by processing circuitry of a decoder. Execution of the instructions causes the decoder to receive a bitstream. The bitstream comprising at least one output process syntax element for configuring an output process. Execution of the instructions can further cause the decoder to determine that the output process is disabled. Execution of the instructions can further cause the decoder to decode a current picture from the bitstream, Execution of the instructions can further cause the decoder to, responsive to determining that the output process is disabled, output (2160) the current picture as an output picture.

According to other embodiments, a non-transitory computer-readable medium is provided having instructions stored therein that are executable by processing circuitry of a bitstream modification entity. Execution of the instructions causes the bitstream modification entity to receive an input bitstream comprising an output process disable indicator. Execution of the instructions can further cause the bitstream modification entity to generate an output bitstream from the input bitstream by copying or forwarding all coded data of the input bitstream except for the coded data representing an output process disable indicator. Execution of the instructions can further cause the bitstream modification entity to set the output process disable indicator in the output bitstream to a value that indicates that an output process is disabled. The at least one output process syntax element is present in the input bitstream and copied or forwarded to the output bitstream.

According to other embodiments, a non-transitory computer-readable medium is provided having instructions stored therein that are executable by processing circuitry of a decoder. Execution of the instructions causes the decoder to receive an input bitstream. Execution of the instructions can further cause the decoder to determine whether an output process is disabled. Execution of the instructions can further cause the decoder to determine a size of an allocation for a decoded picture buffer, DPB, based on whether the output process is disabled.

According to other embodiments, a non-transitory computer-readable medium is provided having instructions stored therein that are executable by processing circuitry of an encoder. Execution of the instructions can cause the encoder to determine an output process disable indicator value, the output process disable indicator value indicating whether an output process is disabled. The instructions can further cause the encoder to determine an output process enable indicator value, separate from the output process disable indicator value, the output process enable value specifying whether at least one output process syntax element is present in the bitstream wherein the at least one output process syntax element comprising instructions for configuring the output process. The instructions can further cause the encoder to encode the output process disable indicator value into the bitstream. The instructions can further cause the encoder to encode the output process enable indicator value into the bitstream. The instructions can further cause the encoder to encode the current picture into the bitstream.

Various embodiments described herein provide a high-level indicator that can be rewritten in a bitstream before the bitstream is passed to a decoder in order to suppress an output process. In some embodiments, potential benefits can occur in using a decoder for transcoding use, where suppressing an output process such as a film grain process, results in cleaner pictures for the encoder stage in the transcoder. The output process, e.g. the film grain process, defined in the input bitstream may then more easily be transferred to the transcoded bitstream.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 1 is a table illustrating an example of HEVC NAL unit header syntax;

FIG. 2 is a table illustrating an example of VVC NAL unit header syntax;

FIG. 3 is a table illustrating an example of NAL unit types in VVC;

FIG. 9 is a table illustrating an example of film grain characteristics SEI message syntax in VVC;

FIG. 10 is a table illustrating an example of film grain parameters syntax in AV1

FIG. 11 is a table illustrating an example of output process disable indicator and output process enable indicator according to some embodiments of inventive concepts;

FIG. 12A is a block diagram illustrating an example of transcoding without the film grain output process disable flag, according to some embodiments of inventive concepts;

FIG. 12B is a block diagram illustrating an example of transcoding with the film grain output process disable flag according to some embodiments of inventive concepts;

FIGS. 16-17 are tables illustrating an example of an adaptation parameter set for an output process according to some embodiments of inventive concepts;

DETAILED DESCRIPTION

Figures 4, 5:
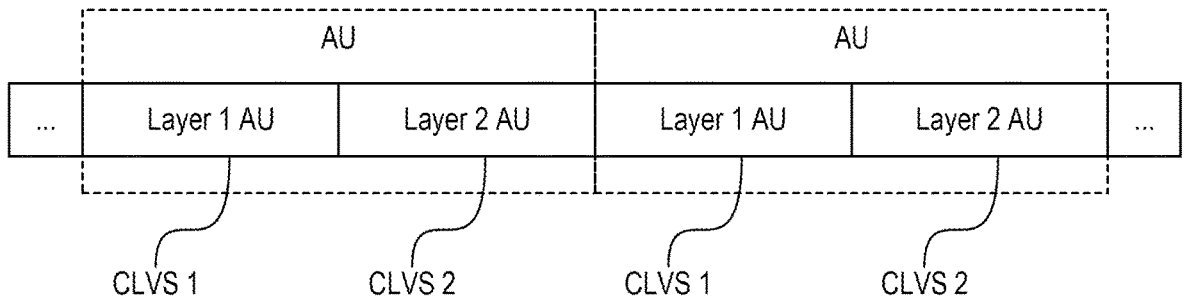
FIG. 4 is a block diagram illustrating an example of layer access units and coded layer video sequences.
FIG. 5 is a table illustrating an example of adaptation parameter set syntax in WC.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Both HEVC and VVC define a Network Abstraction Layer ("NAL"). All the data (e.g., both Video Coding Layer ("VCL") or non-VCL data in HEVC and VVC) can be encapsulated in NAL units. A VCL NAL unit can include data that represents picture sample values A non-VCL NAL unit can include additional associated data such as parameter sets and supplemental enhancement information ("SEI") messages. The NAL unit in HEVC can begin with a header that specifies that the NAL unit type of the NAL unit that identifies what type of data is carried in the NAL unit, the layer ID, and the temporal ID for which the NAL unit belongs. The NAL unit type can be transmitted in the nal_unit_type codeword in the NAL unit header. The type indicates and defines how the NAL unit should be parsed and decoded. The rest of the bytes of the NAL unit can be a payload of the type indicated by the NAL unit type. A bitstream can include a series of concatenated NAL units.

The syntax for the NAL unit header for HEVC is shown in FIG. 1.

The current version of the VVC draft at the time of writing is JVET-P2001-vE. The syntax for the NAL unit header for this current draft is shown in FIG. 2.

The NAL unit types of the current VVC draft are shown in FIG. 3.

The decoding order is the order in which NAL units shall be decoded, which is the same as the order of the NAL units within the bitstream. The decoding order may be different from the output order, which is the order in which decoded pictures are to be output, such as for display, by the decoder.

In HEVC and in the VVC draft, all pictures can be associated with a TemporalId value that specifies a temporal layer to which the picture belongs. TemporalId values can be decoded from the nuh_temporal_id_plus1 syntax element in the NAL unit header. An encoder can set TemporalId values such that pictures belonging to a lower layer are perfectly decodable when higher temporal layers are discarded. Assume for instance, that an encoder has output a bitstream using temporal layers 0, 1, and 2. Then removing all layer 2 NAL units or removing all layer 1 and 2 NAL units will result in bitstreams that can be decoded without problems. This is ensured by restrictions in the HEVC specification that the encoder must comply. For instance, it is not allowed for a picture of a temporal layer to reference a picture of a higher temporal layer.

The value of the nuh_layer_id syntax element in the NAL unit header specifies the layer ID to which the NAL unit belongs.

A layer access unit in VVC can be defined as a set of NAL units for which the VCL NAL units all have a particular value of nuh_layer_id, that are associated with each other according to a specified classification rule, that are consecutive in decoding order, and that contain exactly one coded picture.

A coded layer video sequence ("CLVS") in the current version of VVC can be defined as a sequence of layer access units that include, in decoding order, of a CLVS layer access unit, followed by zero or more layer access units that are not CLVS layer access units, including all subsequent layer access units up to but not including any subsequent layer access unit that is a CLVS layer access unit.

The relation between the layer access units and coded layer video sequences is illustrated in FIG. 4. In the current version of VVC, layers may be coded independently or dependently from each other. When the layers are coded independently, a layer with nuh_layer_id 0 may not predict video data from another layer with nuh_layer_id 1, In the current version of VVC, dependent coding between layers may be used, which enables support for scalable coding with SNR, spatial and view scalability.

The current WC draft includes a picture header, which is a NAL unit having nal_unit_type equal to PH_NUT. The picture header is similar to a slice header, but the values of the syntax elements in the picture header are used to decode all slices of one picture. Each picture in VVC includes a picture header NAL unit followed by all coded slices of the picture where each coded slice is conveyed in one coded slice NAL unit.

For single layer coding in HEVC, an access unit ("AU") can be the coded representation of a single picture. An AU can include several video coding layer ("VCL") NAL units as well as non-VCL NAL units.

An Intra random access point ("IRAP") picture in HEVC is a picture that does not refer to any pictures other than itself for prediction in its decoding process. The first picture in the bitstream in decoding order in HEVC must be an IRAP picture, however, an IRAP picture may also appear later in the bitstream. HEVC specifies three types of IRAP pictures: a broken link access ("BLA") picture, an instantaneous, decoder refresh ("IDR") picture, and a clean random access ("CRA") picture.

A coded video sequence ("CVS") in HEVC is a series of access units starting at an IRAP access unit up to, but not including, the next IRAP access unit in decoding order.

IDR pictures can start a new CVS. An IDR picture may have associated random access decodable leading ("RADL") pictures. An IDR picture may not have associated RASL pictures.

BLA pictures can also start a new CVS and can have the same effect on the decoding process as an IDR picture. However, a BLA picture in HEVC may include syntax elements that specify a non-empty set of reference pictures. A BLA picture may have associated RASL pictures, which are not output by the decoder and may not be decodable, as they may contain references to pictures that may not be present in the bitstream. A BLA picture may also have associated RADL pictures, which are decoded.

A CRA picture may have associated RADL or RASL pictures. As with a BLA picture, a CRA picture may include syntax elements that specify a non-empty set of reference pictures. For CRA pictures, a flag can be set to specify that the associated RASL pictures are not output by the decoder, because they may not be decodable, as they may include references to pictures that are not present in the bitstream. A CRA may or may not start a CVS.

In VVC, there is also the GRA picture which may or may not start a CVS without an Intra picture. A coded layer video sequence start ("CLVSS") picture in VVC is an IRAP picture or a GRA picture. A CLVSS picture in VVC may start a VVC coded layer video sequence ("CLVS"), which can be similar to a CVS in HEN/C.

There is no BLA picture type in VVC.

HEVC specifies three types of parameter sets, the picture parameter set ("PPS"), the sequence parameter set ("SPS"), and the video parameter set ("VPS"). The PPS can include data that is common for a whole picture, the SPS can include data that is common for a coded video sequence ("CVS"), and the VPS can include data that is common for multiple CVSs.

VVC can also use these parameter set types. In VVC, there is also the adaptation parameter set ("APS") and the decoding parameter set ("DRS"), The APS can include information that can be used for multiple slices and two slices of the same picture can use different APSs. The DPS can include information specifying the "worst case" in terms of profile and level that the decoder will encounter in the entire bitstream.

The APS syntax in VVC is shown in FIG. 5. The adaptation_parameter_set_id syntax element can assign an ID value for the syntax element values that are present in an APS. The APS also includes an aps_params_type syntax element that specifies the APS type that controls what process the syntax element values are used for.

The concept of slices in HEVC divides the picture into independently coded slices, where decoding of one slice in a picture is independent of other slices of the same picture. Different coding types could be used for slices of the same picture (e.g., a slice could either be an I-slice, P-slice or B-slice). One purpose of slices is to enable resynchronization in case of data loss. In HEVC, a slice can be a set of CTUs.

In the current version of VVC, a picture may be partitioned into either raster scan slices or rectangular slices. A raster scan slice can include a number of complete tiles in raster scan order. A rectangular slice can include a group of tiles that together occupy a rectangular region in the picture or a consecutive number of CTU rows inside one tile. Each slice has a slice header comprising syntax elements. Decoded slice header values from these syntax elements can be used when decoding the slice. Each slice can be carried in one VCL NAL unit.

In a previous version of the VVC draft specification, slices were referred to as tile groups.

Figure 6:
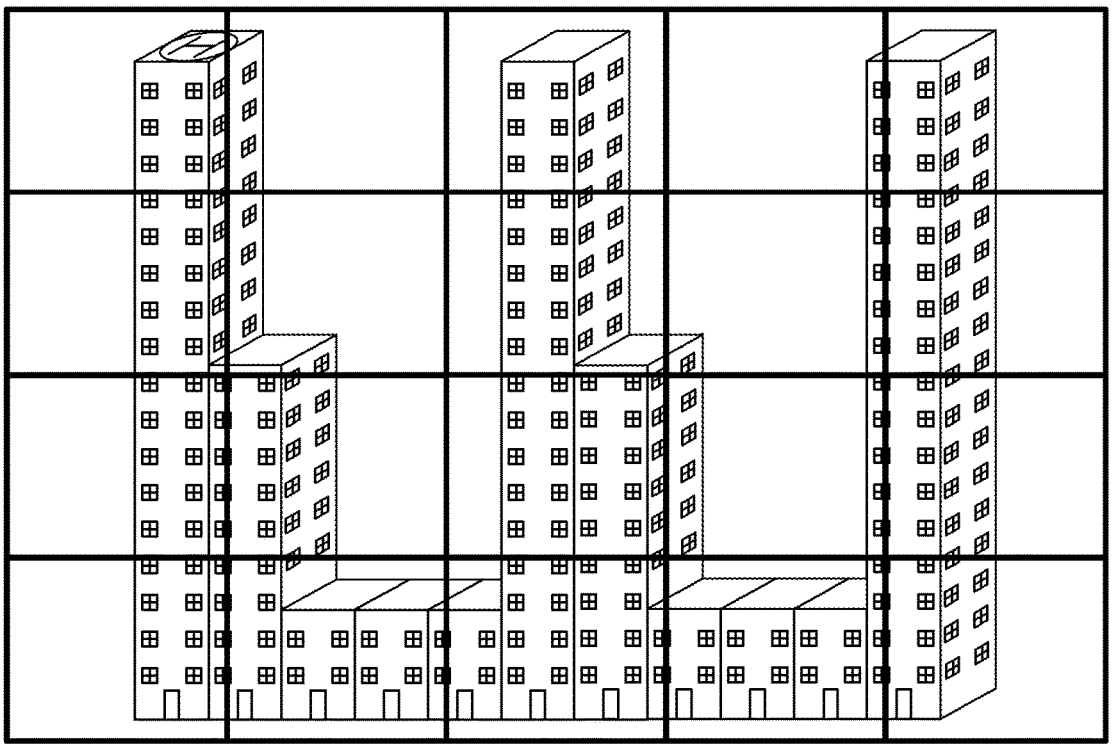
FIG. 6 is a schematic diagram illustrating an example of tile partitioning.

The draft VVC video coding standard includes a tool called tiles that divides a picture into rectangular spatially independent regions. Tiles in the draft VVC coding standard are similar to the tiles used in HEVC. Using tiles, a picture in VVC can be partitioned into rows and columns of CTUs where a tile is an intersection of a row and a column. FIG. 6 shows an example of a tile partitioning using 4 tile rows and 5 tile columns resulting in a total of 20 tiles for the picture.

The tile structure is signaled in the picture parameter set ("PPS") by specifying the thicknesses of the rows and the widths of the columns. Individual rows and columns can have different sizes, but the partitioning always span across the entire picture, from left to right, and top to bottom respectively.

There is generally no decoding dependency between tiles of the same picture. This includes intra prediction, context selection for entropy coding, and motion vector prediction. One exception is that in-loop filtering dependencies are generally allowed between tiles.

Figure 7:
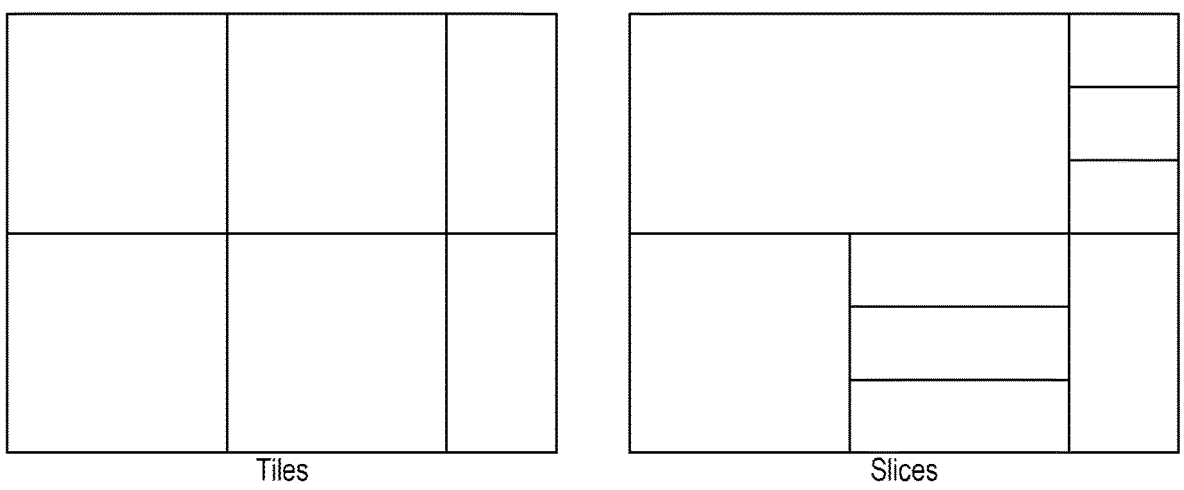
FIG. 7 is a schematic diagram illustrating an example of a rectangular slice.

In the rectangular slice mode in VVC, a tile can further be split into multiple slices where each slice includes a consecutive number of CTU rows inside one tile. FIG. 7 shows an example of a tile partitioning and a rectangular slice partitioning using the tile partitioning in WC.

Pictures in HEVC are identified by their picture order count ("POC") values, also known as full POC values. Each slice can include a code word, pic_order_cnt_lsb, that can be the same for all slices in a picture_pic_order_cnt_lsb is also known as the least significant bits ("lso") of the full POC since it is a fixed-length code word and only the least significant bits of the full POC is signaled. Both encoder and decoder can keep track of POC and assign POC values to each picture that is encoded/decoded. The pic_order_cnt_lsb can be signaled by 4-16 bits. There is a variable MaxPicOrderCntLsb used in HEVC which is set to the maximum pic_order_cnt_lsb value plus 1. This means that if 8 bits are used to signal pic_order_cnt_lsb, the maximum value is 255 and MaxPicOrderCntLsb is set to 2^8=256. The picture order count value of a picture is called PicOrderCntVal in HEVC. Usually, PicOrderCntVal for the current picture is simply called PicOrderCntVal. POC is expected to work in a similar way in the final version of VVC.

The decoded picture buffer ("DPB") is a memory space that is used in the decoder to store decoded pictures. Two reasons for storing a decoded picture in the DPB include: storing pictures so that they can be used for prediction in the decoding process of future pictures; and storing a picture until it is time for it to be output from the decoder. Encoders can encode pictures out-of-order to increase the compression efficiency, and as a result, the decoder may need to store several pictures in the DPB because a not-yet-decoded picture is output before them.

The amount of storage space that is required in a decoder can be controlled using so-called levels. An HEVC bitstream conforms to a particular level, and for each level there is a specified max memory size that no bitstream conforming to that level can exceed. For instance, level 4 has a max luma picture size (MaxLumaPs) of 2,228,224 luma samples. That fits a 2048×1080 picture. If the picture luma size (PicSizeInSamplesY) for the pictures in a bitstream is equal to e.g. 2048×1080, the maximum DPB size is set equal to 6. If the current picture luma size is equal to e.g. 480×240, the maximum DPB size is equal to 16. One way HEVC calculates the DPB size (MaxDpbSize) given the MaxLumaPs from the level and the luma picture size is as follows:

if(PicSizeInSamplesY<=(MaxLumaPs>>2))
　　MaxDpbSize=Min(4*maxDpbPicBuf, 16)
else if(PicSizeInSamplesY<=(MaxLumaPs>>1))
　　MaxDpbSize=Min(2*maxDpbPicBuf, 16)
else if(PicSizeInSamplesY<=((3*MaxLumaPs)>>2)
　　MaxDpbSize=Min((4*maxDpbPicBuf)/3, 16)
else
　　MaxDpbSize=maxDpbPicBuf where MaxLumaPs is specified in Table A.6 and maxDpbPicBuf is equal to 6

Table A.6 is a table in the HEVC specification that provides a MaxLumaPs value for each level.

VVC is expected, to have a similar DPB structure and level definition as HEVC, but may allow for slightly more pictures in the DPB. In the current version of VVC maxDpbPicBuf is equal to 8.

Reference picture management in HEVC is done using reference pictures sets ("RPS"). The reference picture set is a set of reference pictures that is signaled in the slice headers. When the decoder has decoded a picture, it is put together with its POC value in the DPB When decoding a subsequent picture, the decoder parses the RPS syntax from the slice header and constructs lists of reference picture POC values. These lists can be compared with the POC values of the stored pictures in the DPB and the RPS can specify which pictures in the DPB to keep in the DPB and which pictures to remove. All pictures that are not included in the RPS are marked for removal from the DPB A picture that is marked for removal and has been output may be deleted from the DPB and the storage space that was used for the picture can be used for other pictures.

One main property of the HEVC reference picture management system is that the status of the DPB as it should be before the current picture is decoded is signaled for every slice. This enables the decoder to compare the signaled status with the actual status of the DPB and determine if any reference picture is missing.

The reference picture management in the draft VVC specification differ slightly from the one in HEVC. In HEVC, the RPS is signaled and the reference picture lists to use for Inter prediction is derived from the RPS In the draft VVC specification, the reference pictures lists ("RPL") are signaled and the RPS is derived. However, in both specifications, signaling of what pictures to keep in the DPB, what pictures should be short-term and long-term is done. Using POC for picture identification and determination of missing reference pictures is done the same in both specifications.

Figure 8:
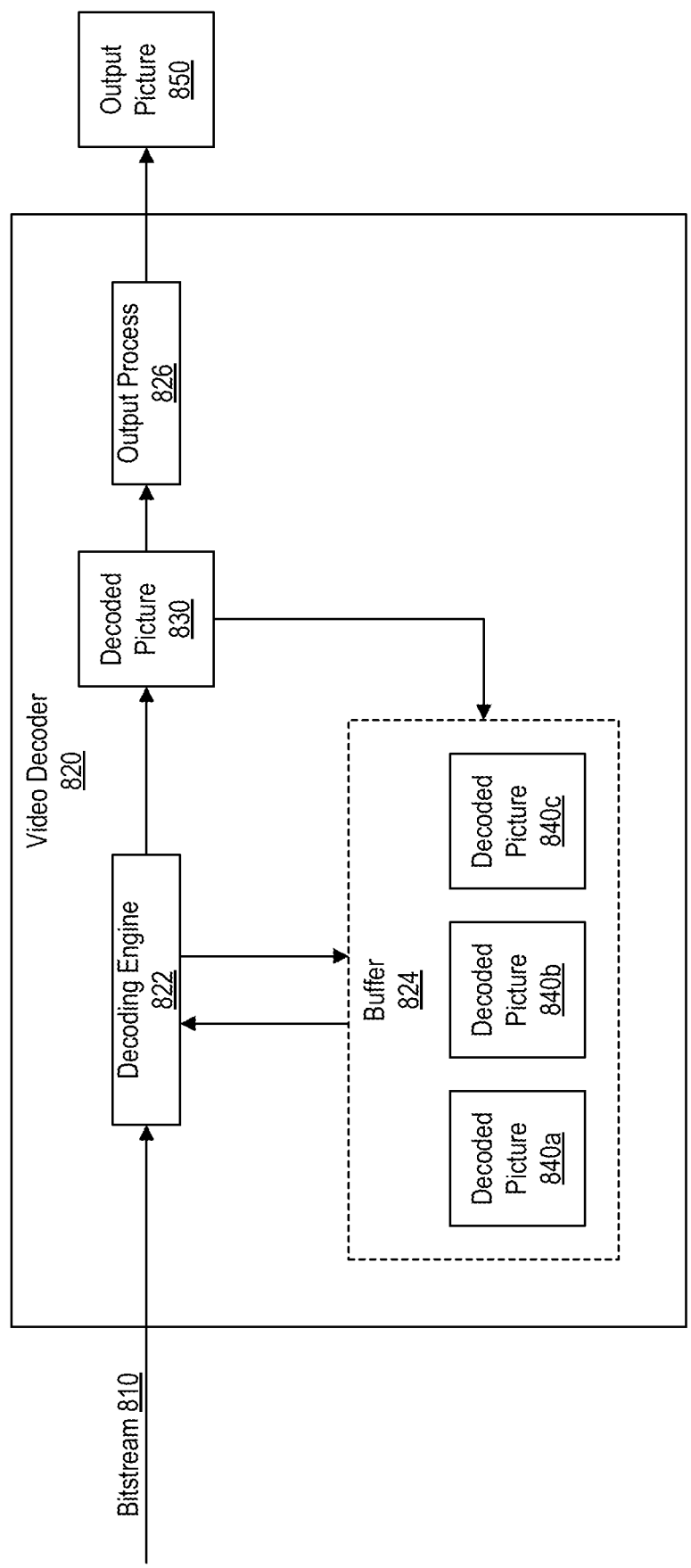
FIG. 8 is a block diagram illustrating an example of an output process.

FIG. 8 shows an output process in a decoding system. The input to the video decoder 820, the bitstream 810, is decoded by a decoding engine 822 in a decoding process to one or more decoded pictures 830. The decoded picture is finally subject to an output process 826 and output as output picture 850.

The input to the output process 826 is the decoded picture 830 and the output of the output process 826 is the output picture 850. The decoded picture 830 that is used as input to the output process 826 may be stored in the decoded picture buffer 824 and may be used in the decoding process of other, future pictures. In this example, previous decoded pictures 840a-c may have been used to by the decoding engine 822 to generate the decoded picture 830. The output picture 850 may not be identical to the decoded picture 830. In this case, the output picture 850 may be stored as a separate picture in memory.

The output process 826 may output an output picture 850 that is a modified version of the decoded picture 830 that may have been modified in a number of different ways, such as one of the following or a combination of two or more of the following:

1 Apply film grain;
2. Apply a color transform and/or color component value scaling;
3. Apply a projection mapping or inverse projection mapping such as converting the decoded picture from a cube map projection to a spherical representation or to an equirectangular representation;
4, Perform a region-wise packing or region-wise unpacking of the picture by a set of region-wise operations such as repositioning, scaling and rotation
5. Crop the decoded picture;
6. Convert the decoded picture to a different color format such as rom Rec 709 to PQ;
7. Convert the decoded picture to a different chrome format such as from YUV 4:2:0 to YUV 4:4:4;
8. Scale or resample the picture from a decoded resolution to an output resolution
9. Convert to a different sample aspect ratio;
10. Convert two decoded fields to an interlaced picture;
11. Apply/remove frame packing;
12. Extracting one or more subpictures (similar to cropping the decoded picture but may for instance comprise merging subpictures from different locations in the picture;
13. Apply post filtering such as deblocking filtering, anti-banding filtering, anti-aliasing filtering, sharpening filtering and blurriness filtering: and
14. Apply overlays such as timed text, logos, and sport graphics.

Noise in video originates from different sources. Since noise generally is random, it can't be efficiently compressed. Therefore, a noisy input picture is often suppressed by the encoder in a pre-filtering stage before the picture is actually encoded. When the picture is reconstructed at the decoder before output, a modelled or an unmodelled noise can be added to the decoded frame. One reason to add noise is to preserve the artistic intent. Another reason is to hide coding artifacts such as blurriness, crunchiness, or blockiness caused by encoder compression.

According to the description of the supplemental enhancement information in the draft of the VVC standard as specified in JVET-P2007-v3.docx, a film grain output process is supported in VVC. This process is essentially identical to the film grain output processes specified in the H.264 and HEVC video coding standards. The process includes an SEI message that carries a parametrized model for film grain synthesis in the decoder.

The film grain characteristic SEI message includes a cancel flag, film_grain_characteristics_cancel_flag, which enables the process if it is set equal to 0. Also, when the flag is set to 0, film grain parameter syntax elements follow the flag. At last, film_grain_characteristics_persistence_flag specifies the persistence of the film grain characteristic SEI message for the current layer. In FIG. 9, a simplified version of the syntax is shown.

The AV1 video format supports film grain generation. The film grain can be applied after decoding and before a picture is output. The sequence_header_obu( ) includes a film_grain_params_present flag that is an enable flag for the film grain signaling and process. The film grain parameters can be signaled last in the frame_header_obu( ) in a syntax table called film_grain_params( ), which is shown in FIG. 10.

In film_grain_params( ), a flag, apply_grain, can control whether film grain shall be applied to the current picture or not. A 16-bit grain_seed syntax element can be used as a seed for a pseudo-random number generator to, generate the grains. The update_grain flag can specify whether film grain parameter values from a reference picture should be used, or if the film grain parameter values to use shall be decoded from the frame header. The reference picture to use is identified by the film_grain_params_ref_idx syntax element value. In FIG. 10, the frame header film grain parameters are represented by the more_film_grain_parameters( ) row to simplify the table.

Figure 18:
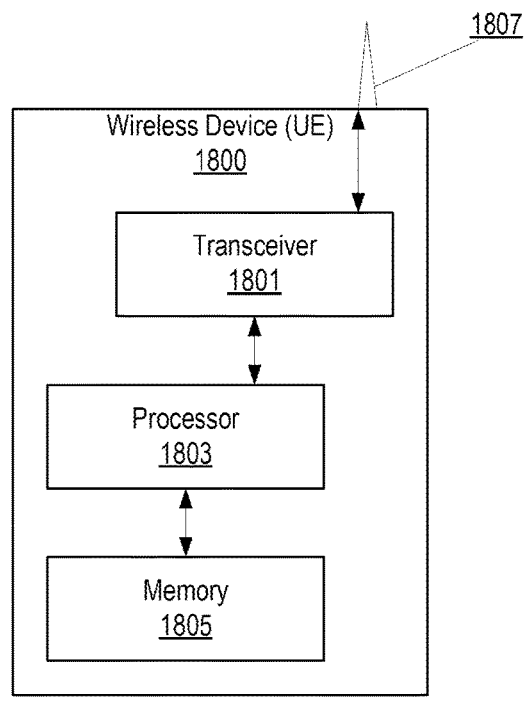
FIG. 18 is a block diagram illustrating a wireless device UE according to some embodiments of inventive concepts.

FIG. 18 is a block diagram illustrating elements of a terminal device ("UE") 1800 (also referred to as a mobile terminal, a mobile communication terminal, a wireless communication device, a wireless terminal, mobile device, a wireless communication terminal, user equipment, UE, a user equipment node/terminal/device, etc.) configured to receive a coded representation of data (e.g., a bitstream or video sequence) according to embodiments of inventive concepts. As shown, the UE 1800 may include an antenna 1807 and transceiver circuitry 1801 including a transmitter and a receiver configured to provide uplink and downlink radio communications with a base station(s) of a radio access network. UE 1800 may also include processing circuitry 1803 coupled to the transceiver circuitry, and memory circuitry 1805 coupled to the processing circuitry. The memory circuitry 1805 may include computer readable program code when executed by the processing circuitry 1803 causes the processing circuitry to perform operations according to embodiments disclosed herein. According to other embodiments, processing circuitry 1803 may be defined to include memory so that separate memory circuitry is not required. UE 1800 may also include an interface (such as a user interface) coupled with processing circuitry 1803, and/or wireless device UE may be incorporated in a vehicle.

As discussed herein, operations of UE 1800 may be performed by processing circuitry 1803 and/or transceiver circuitry 1801. For example, processing circuitry 1803 may control transceiver circuitry 1801 to transmit communications through transceiver circuitry 1801 over a radio interface to a radio access network node (also referred to as a base station) and/or to receive communications through transceiver circuitry 1801 from a RAN node over a radio interface. Moreover, modules may be stored in memory circuitry 1805, and these modules may provide instructions so that when instructions of a module are executed by processing circuitry 1803, processing circuitry 1803 performs respective operations (e.g., operations discussed below with respect to Example Embodiments relating to wireless devices). In some embodiments, UE 1800 may include a display for displaying images decoded from a received bitstream. For example, UE 1800 can include a television.

Figure 19:
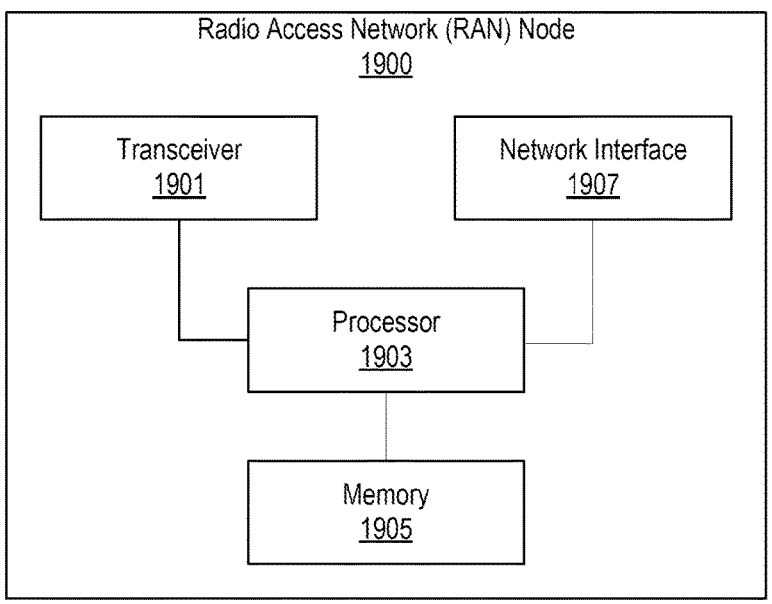
FIG. 19 is a block diagram illustrating a decoder according to some embodiments of inventive concepts.

FIG. 19 is a block diagram illustrating elements of a decoder 1900 configured to decode a bitstream according to embodiments of inventive concepts. The decoder 1900 may include network interface circuitry 1907 (also referred to as a network interface) configured to communicate with other devices. The decoder 1900 may also include processing circuitry 1903 (also referred to as a processor) coupled to memory circuitry 1905 (also referred to as memory) coupled to the processing circuitry. The memory circuitry 1905 may include computer readable program code that when executed by the processing circuitry 1903 causes the processing circuitry to perform operations according to embodiments disclosed herein. According to other embodiments, processing circuitry 1903 may be defined to include memory so that a separate memory circuitry is not required.

As discussed herein, operations of the decoder 1900 may be performed by processing circuitry 1903 and network interface 1907. For example, processing circuitry 1903 may control network interface 1907 to receive and/or transmit coded representations of data to one or more bitstream modification entities (e.g., a transcoder). Moreover, modules may be stored in memory 1905, and these modules may provide instructions so that when instructions of a module are executed by processing circuitry 1903, processing circuitry 1903 performs respective operations (e.g., operations discussed below with respect to Example Embodiments relating to decoders).

Figure 20:
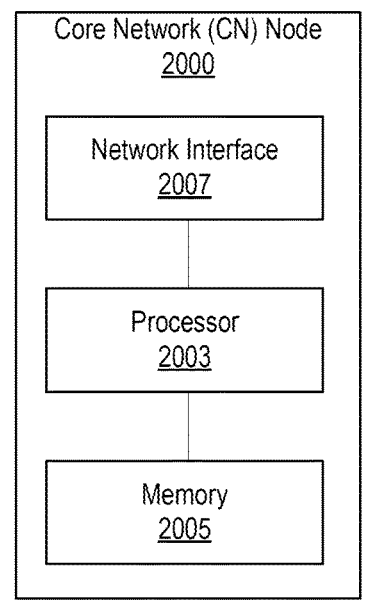
FIG. 20 is a block diagram illustrating an encoder according to some embodiments of inventive concepts.

FIG. 20 is a block diagram illustrating elements of an encoder 2000 configured to encode a bitstream according to embodiments of inventive concept. As shown, the encoder 2000 may include network interface circuitry 2007 (also referred to as a network interface) configured to communicate bitstreams with one or more other devices. The encoder 2000 may also include a processing circuitry 2003 (also referred to as a processor) coupled to the network interface circuitry, and memory circuitry 2005 (also referred to as memory) coupled to the processing circuitry. The memory circuitry 2005 may include computer readable program code that when executed by the processing circuitry 2003 causes the processing circuitry to perform operations according to embodiments disclosed herein. According to other embodiments, processing circuitry 2003 may be defined to include memory so that a separate memory circuitry is not required.

It can be beneficial for decoders to be configured to either apply an output process, such as applying film grain, or not apply the output process. A transcoder can configure a decoder to not apply the output process in order to transcode the picture or pictures in its original format. The transcoder can further be configured to copy the output process parameter values from the input bitstream before transcoding to the transcoded bitstream. Furthermore, using an output process compared to not using an output process can cost one additional picture storage slot in a decoder.

Various embodiments described herein introduce an output process disable indicator that is capable of suppressing the output process such that the input picture and the output picture of the output process are identical. The output process disable indicator may not have any output process syntax element gating property, which means that the output process syntax elements may be present in the bitstream and may be parsed by the decoder regardless of the value of the output process disable indicator.

In some embodiments, a high-level indicator is provided that can be rewritten in a bitstream before the bitstream is passed to a decoder in order to suppress an output process. This can be beneficial when using a decoder for transcoding use, where suppressing an output process such as a film grain output process, results in cleaner pictures for the encoder stage in the transcoder. The output process (e.g. a film grain output process) defined in the input bitstream may then more easily be transferred to the transcoded bitstream.

Various embodiments are described below. Itis to be understood by a person skilled in the art that two or more embodiments, or parts of embodiments, may be combined to form new embodiments which are still covered by this disclosure.

The methods below can be applied to a single still picture or to a video sequence of pictures. In some embodiments, suppression of an output process or a sub-process in a video decoder is introduced. A sub-process can be one process or a part of a process including: applying film grain; applying a color transform and/or color component value scaling; applying a projection mapping or inverse projection mapping such as converting the decoded picture from a cube map projection to a spherical representation or to an equirectangular representation; performing a region-wise packing or region-wise unpacking of the picture by a set of region-wise operations such as repositioning, scaling and rotation; cropping the decoded picture; converting the decoded picture to a different color format such as from Rec 709 to PQ; converting the decoded picture to a different chrome format such as from YUV 4:2:0 to YUV 4:4:4; scaling or resampling the picture from a decoded resolution to an output resolution; converting to a different sample aspect ratio; converting two decoded fields to an interlaced picture; applying/removing frame packing; extracting one or more subpictures (similar to cropping the decoded picture but may for instance comprise merging subpictures from different locations in the picture; applying post filtering such as deblocking filtering: anti-banding filtering, anti-aliasing filtering, sharpening filtering and blurriness filtering; and applying overlays such as timed text, logos, and sport graphics.

The output process 826 of FIG. 8 may include several sub-processes. Herein, "process" may be used to denote either process or a sub-process.

An output process may have an input of a decoded picture and the output from the output process may be a modified decoded picture that is not identical to the decoded picture. The decoded picture may be stored in a decoded picture buffer. The modified decoded picture may be output from a video decoder and may therefore be called an output picture. The bitstream input to the video decoder may include one or more output process syntax elements that control or configure the output process, where the control and/or configuration of the output process controls/configures the sample values of the output picture such that two different sets of output process syntax element values results in output pictures that are not identical. Syntax elements that enables or disables the output process may not be considered to be output process syntax elements since they control whether or not the output process is enabled rather than controlling the sample values of the output picture.

Some output process designs include an output process enable indicator, often in the form of a flag. In some embodiments, an additional output process disable indicator is added that controls the output process as shown in FIG. 11. There can be two possible output process disable indicator values, one first value V1 indicating or specifying that the output process is disabled and one different second value V2 indicating or specifying that the output process is not disabled.

If the output process disable indicator value is equal to V1, the decoder will not modify the decoded picture by any output process. In other words, the decoded picture and the output picture are identical. However, whether or not the bitstream contains output process syntax elements is not dependent on the output process disable indicator value. Output process syntax elements are parsed by the decoder even if the value of the output process disable indicator is equal to V1 given that the value of the output process enable indicator is equal to 'enable'. It is preferable that no output process syntax elements are conditioned on the value of the output process disable indicator.

If the output process disable indicator value is equal to V2, the output process is not disabled. This means that the output process disable indicator is ignored such that the output process is fully controlled by other indicators and/or syntax elements in the bitstream.

The output process disable indicator may be encoded, carried and decoded as any types of syntax elements such as a binary flag, a variable length code word or arithmetically coded symbols.

In additional or alternative embodiments, combination 4 in FIG. 11 is disallowed such that the combination is either not possible to be expressed by syntax elements in the bitstream, or is explicitly forbidden by a constraint such as "it is a requirement of bitstream conformance that when output process enable indicator value is equal to 'disable' the output process disable indicator value shall be equal to 'disable.'"

In additional or alternative embodiments, combination 1-3 or combination 1-4 in the FIG. 11 are signaled as a mode using one single syntax element that is decoded to one of three or four values respectively.

In some embodiments, the output process disable indicator is realized as a separate flag called an "output process disable flag." The output process disable flag may be decoded from a DPS, VPS, SPS, PPS, picture header or slice header. The flag may be decoded from a DPS, VPS or SPS since those parameter set types are generally used by many pictures which means that the number of source bitstream modifications to disable the output process may be minimized.

In some embodiments, a decoder may perform all or a subset of the following operations for decoding and outputting a picture from a bitstream. First, the decoder may decode an output process disable indicator value from a bitstream, wherein the output process disable indicator value specifies that the output process is disabled and wherein the output process disable indicator value may be decoded from a flag in the bitstream. Second, the decoder may decode an output process enable value, separate from the output process disable indicator value, from the bitstream wherein the output process enable value specifies that output process syntax elements are present in the bitstream, and wherein the output process enable value may be decoded from a flag in the bitstream. Third, the decoder may parse the output process syntax elements from the bitstream wherein the output process syntax elements may be present in a parameter set in the bitstream. Fourth, the decoder may decode a current picture from the bitstream. Fifth, the decoder may output the current picture as an output picture, wherein the output picture is identical to the decoded picture as, a response to the output process disable indicator value specifying that the output process is disabled.

In some embodiments, a transcoder can include a processor (e.g., a preprocessor), a decoder and an encoder and may perform all or a subset of the following operations for transcoding and outputting a transcoded bitstream. First, the processor of the transcoder can modify an output process disable indicator value in an input bitstream, wherein the modified output process disable indicator value specifies that the output process is disabled and wherein the output process disable indicator value may be a flag in the input bitstream. Second, the decoder of the transcoder can decode the output process disable indicator value from the input bitstream. Third, the decoder of the transcoder can decode an output process enable value, separate from the output process disable indicator value, from the input bitstream wherein the output process enable value specifies that output process syntax elements are present in the input bitstream, and wherein the output process enable value may be decoded from a flag in the input bitstream. Fourth, the decoder of the transcoder can parse the output process syntax elements from the input bitstream wherein the output process syntax elements may be present in a parameter set in the input bitstream. Fifth, the decoder of the transcoder can decode a current picture from the input bitstream. Sixth, the decoder of the transcoder can output the current picture as an output picture, wherein the output picture is identical to the decoded picture as a response to the output process disable indicator value specifying that the output process is disabled. Seventh, the encoder of the transcoder can encode the output picture into a transcoded bitstream.

In some embodiments, the output process disable flag can be used when the output process is a film grain output process. In these embodiments, the output process disable flag can be referred to a film grain output process disable flag. The output process syntax elements can include film grain syntax elements such as film grain model syntax elements and seed syntax elements.

Some embodiments can make it easy to rewrite a bitstream such that any picture output by a decoder is output without applying that specific output process. This can be helpful for film grain output process transcoding scenarios where, for example, an input bitstream of a higher bitrate is transcoded to an output bitstream of a lower bitrate.

FIGS. 12A-B illustrate transcoding with and without the output process disable flag. In transcoder 1220a of FIG. 12A, the input source bitstream 1210a is decoded by the decoder 1224a of the transcoder 1220a to one or more output pictures. These output pictures are encoded by the encoder 1226a of the transcoder into a transcoded bitstream 1230a. If the source bitstream 1210a specifies that film grain shall be added to the one or more pictures before decoder output, the input pictures to the encoder will contain film grain which makes the encoding inefficient since film grain has the characteristics of noise. Encoding a clean picture without noise is easier than encoding the same picture with noise added. Note that the decoder 1224a of the transcoder 1220a may be implemented by using a third-party decoder that applies film grain according to the source bitstream 1210a without any configuration possibilities to disable the film grain output process and output clean pictures. Note also that disabling the film grain output process by modifying the source bitstream 1210a may not be easy since there may be many film grain syntax elements in the source bitstream 1210a that then need to be rewritten.

In the transcoder 1220b implementation of FIG. 12B, the film grain output process disable flag is present in the source bitstream 1210b and can be modified in the "set value" module 1222b and be changed from a value equal to V2 to a value equal to V1. This can change the source bitstream 1210b to a modified bitstream 1212b. The modified bitstream 1212b can then be decoded by the decoder 1224b that now outputs the pictures without added film grain. This can mean that the encoding at the encoder 1226b in transcoder 1220b can be done more efficiently than the encoding in encoder 1226a in transcoder 1220a since the input pictures fed to the encoder 1226b in transcoder 1220b are clean and free from added noise.

Figure 13:
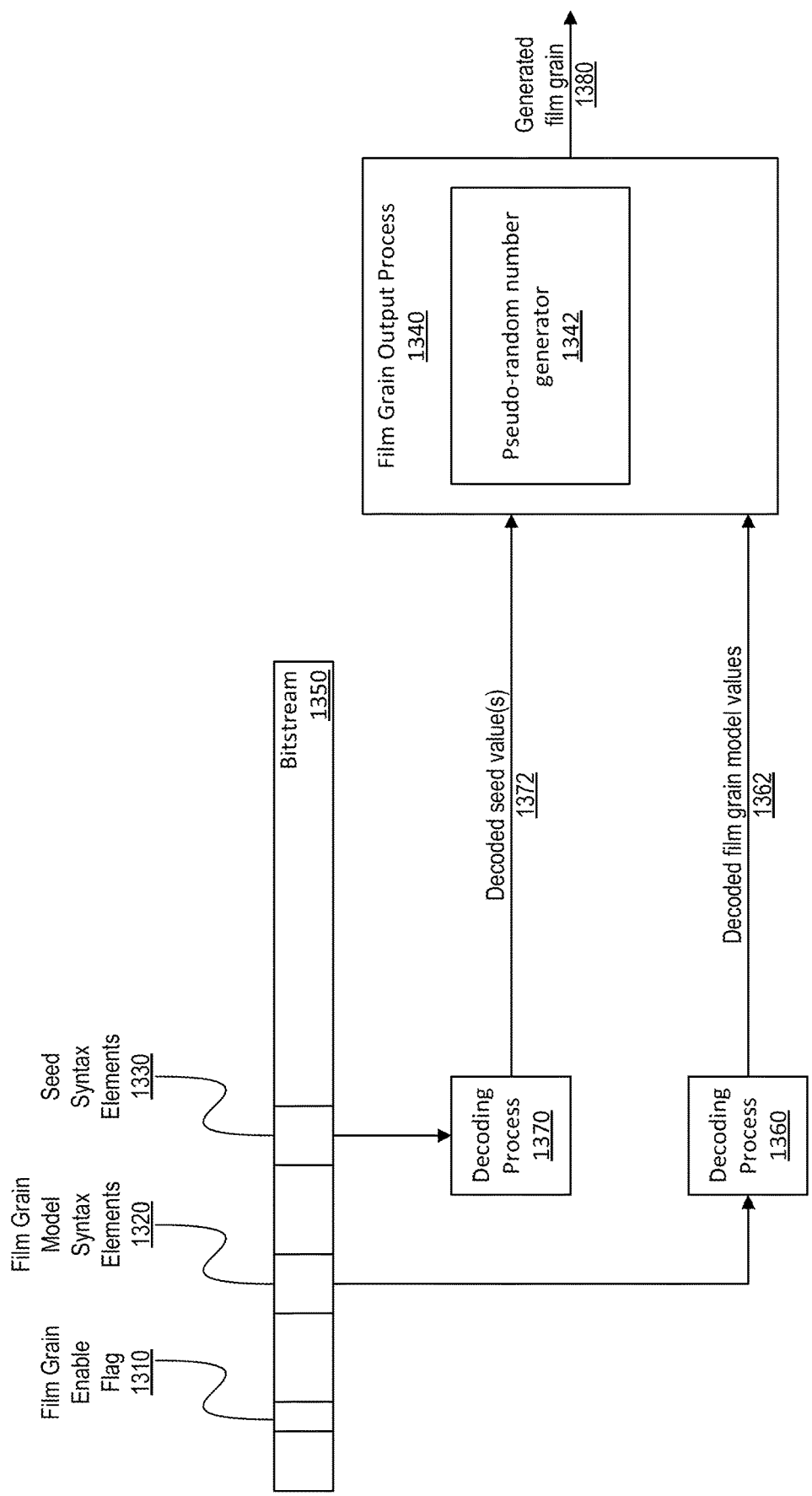
FIG. 13 is a block diagram illustrating an example of a film grain model according to some embodiments of inventive concepts.

In some embodiments, the model of signaling film grain syntax elements in a coded picture or a coded video sequence, as illustrated in FIG. 13, is used. The model can include: a film grain enable flag 1310; film grain model syntax elements 1320; one or more seed syntax elements 1330; and a film grain output process 1340.

The film grain enable flag 1310 can be signaled in a coded picture or video data representation such as the bitstream 1350. One value of the flag 1310 can specify that film grain generation is enabled and that film grain output process syntax elements are present in the bitstream 1350. Another value of the flag 1310 can specify that the film grain generation is disabled and that no film grain output process syntax elements are present in the bitstream 1350. The film grain enable flag 1310 corresponds to the output process enable indicator in FIG. 11. The film grain enable flag 1310 may be a 1 bit flag in the bitstream 1350.

One or more seed syntax elements 1330 can be signaled in the bitstream 1350. The seed syntax elements 1330 can be decoded to one or more decoded seed values 1372 in a decoding process 1370. In the bitstream 1350, there are also film grain model syntax elements 1320 that are decoded to decoded film grain model values 1362 in a decoding process 1360. The film grain output process 1340 uses the decoded seed value(s) 1372 and the decoded film grain model values 1362 as input to generate the generated film grain 1380. The generated film grain 1380 is applied to a picture that is decoded from the bitstream 1350. The generated film grain 1380 can be applied such that one version of the decoded picture with film grain is output by the decoder and another version of the decoded picture without film grain is stored by the decoder for inter prediction of future pictures.

The film grain output process 1340 can include a pseudo-random number generator 1342 that uses the decoded seed value(s) as input. The pseudo-random number generator 1342 can be initialized by the decoded seed value(s) 1372 and operates in a manner such that the sequence of generated values from the pseudo-random number generator 1342 is identical if the seed value(s) used for initialization is identical. This can mean that the generated film grain 1380 is fully controlled by syntax elements in the bitstream 1350. In additional or alternative embodiments, there may be no seed syntax element(s) 1330 in the bitstream 1350. Then the film grain syntax elements include film grain model syntax elements 1320 only.

If the film grain enable flag 1310 specifies that film grain generation is disabled, no generated film grain 1380 is applied to any picture and the film grain output process 1340 is not executed. In addition, the presence of all other film grain syntax elements such as the film grain model syntax elements 1320 and the seed syntax element(s) 1330 may be conditioned on the film grain enable flag 1310 such that they are not present in the bitstream 1350 if the flag 1310 specifies that film grain generation is disabled.

Figures 14, 15:
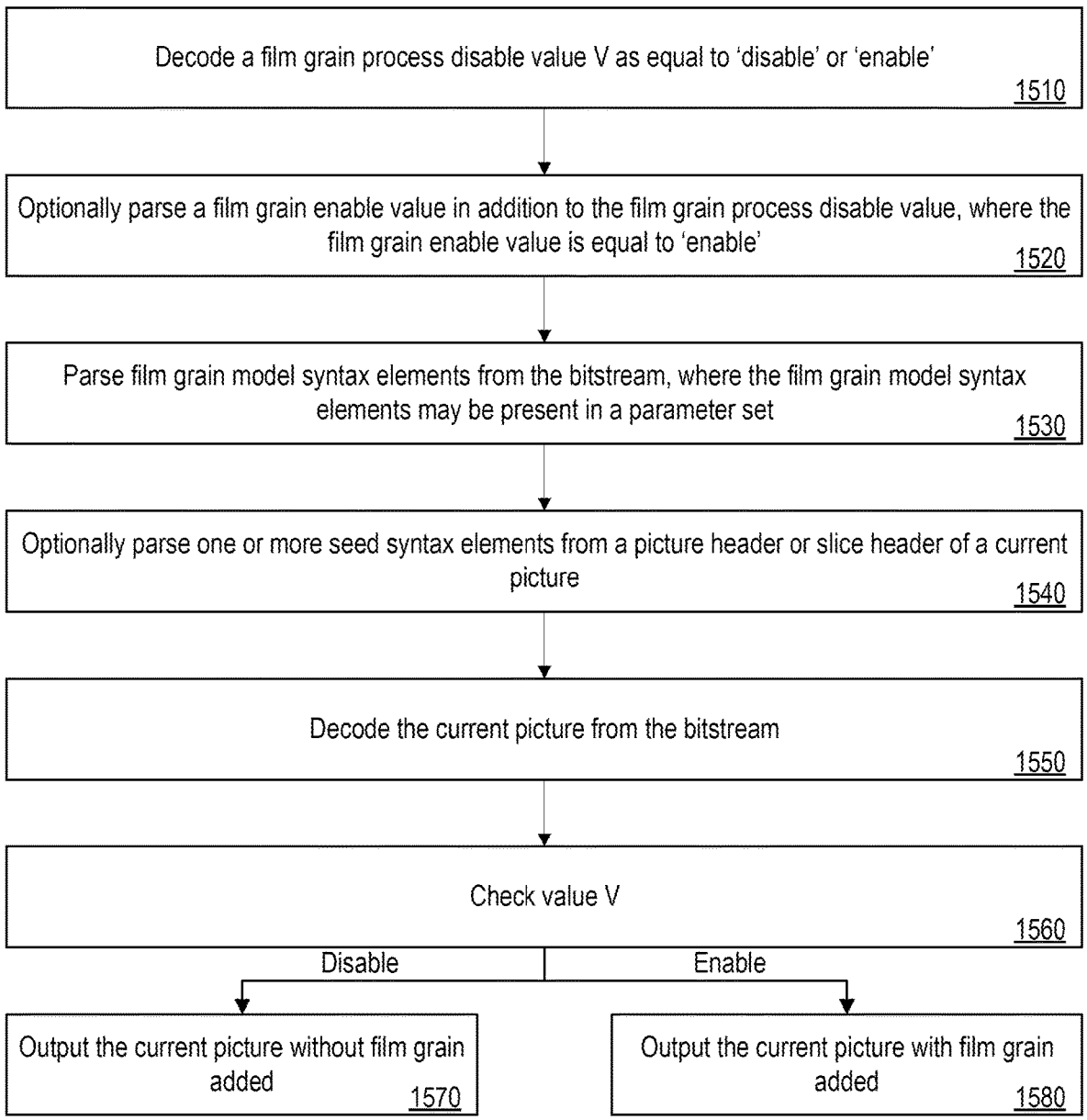
FIG. 14 is a table illustrating an example of film grain output process disable flag according to some embodiments of inventive concepts.
FIG. 15 is a flow chart illustrating an example of a process to disable a film grain output process according to some embodiments of inventive concepts.

FIG. 14 illustrates examples of syntax and semantics for the film grain output process disable flag on top of the model. A parameter_set_film_grain_process_disable_flag equal to 1 can specify that no generated film grain is applied to any output picture using the parameter set.

In some embodiments, a decoder may perform all or a subset of the operations illustrated in FIG. 15 for decoding and outputting a picture from a bitstream. At block 1510, the decoder can decode a film grain output process disable value, wherein the film grain output process disable value specifies that the film grain output process is disabled. At block 1520, the decoder can decode a film grain enable value in addition to the film grain output process disable value wherein the film grain enable value specifies that film grain syntax elements are present in the bitstream. At block 1530, the decoder can parse the film grain model syntax elements wherein the film grain model syntax elements may be present in a parameter set in the bitstream. At block 1540, the decoder can parse one or more seed syntax elements from a picture header of a current picture or from a slice header of a current picture. At block 1550, the decoder can decode a current picture from the bitstream. At block 1560 the decoder can check whether the film grain output process disable value is enabled or disabled. If disabled, at block 1570, the decoder may not apply any film grain generated from any film grain generation process on the decoded current picture as a response to the film grain output process disable value specifying that the film grain output process is disabled and the decoder can output the current picture without any applied film grain. If enabled, at block 1533 the decoder can output the current picture with film grain added.

In some embodiments, the value of the output process disable indicator is not signaled by any dedicated syntax element or syntax elements. Instead the value of the output process disable indictor can be inferred by the presence of the parameter set that contains output process syntax elements.

An adaptation parameter set can be used for carrying the output process syntax elements. Using the APS for controlling an output process is illustrated in FIGS. 16-17. Referring to FIG. 5, a specific APS type may be used for conveying output process syntax elements of a particular output process. As an example, an APS type value equal to 3 is used for the exemplary output process. In the picture header and/or slice header, there may be an output_process_aps_id syntax element that specifies which APS to use for the current picture or slice. The output_process_aps_id syntax element may be gated by an output process enable flag as explained earlier.

In this APS example, modifications of a source bitstream for a transcoder in order to suppress the output process may comprise setting the output process enable flag equal to 0 which is not complicated. However, the output_process_aps_id syntax element in every picture header and/or every slice header in the source bitstream also needs to be removed from the source bitstream which is a complicated operation since the bits succeeding the output process aps id need to be aligned accordingly.

Some embodiments can allow output_process_aps_id values for which there is no APS with a value of adaptation_parameter_set_id equal to output_process_aps_id preceding the picture header or slice header in decoding order in the bitstream. It can be noted that this is not allowed in the current draft VVC specification since that draft contains the following text; "Each APS RBSP shall be available to the decoding process prior to it being referenced".

In some embodiments, if an output process APS is not available to the decoding process prior to it being referenced, the output process disable indicator is inferred to be equal to 'disable', which is the same as equal to the value V1 in FIG. 11. This means that the output process can be suppressed by removing all APS from the source bitstream and keep all picture headers and slice headers as-is, which is much less complicated than modifying the picture and/or slice headers.

In some embodiments, a decoder may perform all or a subset of the following operations for decoding and outputting a picture from a bitstream. First, decode a first output_process_aps_id value from a slice header or from a picture header. Second, decode the current picture. Third, if there is a stored APS with an ID value matching the first value, derive an output picture by executing an output process taking the current picture and at least one value decoded from the stored APS as input, and output the output picture. Otherwise (there is no stored APS with an ID value matching the first value), do not execute the output process for the current picture and output the current picture.

In some embodiments, no syntax elements in, for example, the picture header or slice header, can depend on any syntax element value in the output process APS.

In some embodiments, the value of the output process disable indicator is not signaled by any dedicated syntax element or syntax elements. Instead, the value of the output process disable indictor is provided by external means.

External means here can mean that a video coding specification has not included any means for conveying the indicator value in the bitstream. The way the external means mechanism is used in a video coding specification is to specify that the value of a specific variable is set by external means. Then there is one or more video decoding processes that depend on the variable value such that the output from the video decoder for a given bitstream is not necessarily identical for different variable values. A video decoder can be conforming for all possible variable values, which can mean that the options provided by the variables set by external means are endorsed. Without this endorsement, a video coder that modifies or omits some processes specified in the video coding specification may be considered not compliant with the specification.

In some embodiments, a decoder may perform all or a subset of the following operations for decoding and outputting a picture from a bitstream. First, the decoder can be provided with an output process disable indicator value, wherein the output process disable indicator value specifies that the output process is disabled. Second, the decoder can decode an output process enable value from the bitstream wherein the output process enable value specifies that output process syntax elements are present in the bitstream, and wherein the output process enable value may be decoded from a flag in the bitstream. Third, the decoder can parse the output process syntax elements from the bitstream wherein the output process syntax elements may be present in a parameter set in the bitstream. Fourth, the decoder can decode a current picture from the bitstream. Fifth, the decoder can output the current picture as an output picture, wherein the output picture is identical to the decoded picture as a response to the output process disable indicator value specifying that the output process is disabled.

In additional or alternative embodiments, for a film grain output process, the decoder may perform all or a subset of the following operations for decoding and outputting a picture from a bitstream. First, the decoder can be provided with an output process disable indicator value, wherein the film grain output process disable value specifies that the film grain output process is disabled. Second, the decoder can decode a film grain enable value that specifies that film grain syntax elements are present in the bitstream. Third, the decoder can parse the film grain model syntax elements wherein the film grain model syntax elements may be present in a parameter set in the bitstream. Fourth, the decoder can parse one or more seed syntax elements from a picture header of a current picture or from a slice header of a current picture. Fifth, the decoder can decode a current picture from the bitstream. Sixth, the decoder may not apply any film grain generated from any film grain generation process on the decoded current picture as a response to the film grain output process disable value specifying that the film grain output process is disabled. Seventh, the decoder can output the current picture without any applied film grain.

In some embodiments, the output process disable indicator value may be provided to a decoder by one of a number of ways including: by external means as a parameter value in a decoder API; by reading a hard-coded value stored in a memory or from a storage medium; by reading decoder configuration data; or from a container carrying the coded bitstream such as an ISO base media file format based container or provided in a control signaling such as in a Dynamic Adaptive Streaming ever HTTP (DASH) manifest.

As shown in FIG. 8, the output process outputs sample values that are different than the ones that are stored in the DPB (Buffer in FIG. 8), If the output process is disabled, the decoder can output the decoded picture as-is. But, if the output process is enabled, the decoder needs to store the output picture in addition to the DPB pictures. This added storage can be a cost for the decoder. In some embodiments, the required DPB size for a given level and a given picture size is made dependent on whether or not an output process is enabled or not.

A maximum number of picture storage buffers or a number of picture storage buffers needed to decode a bitstream can be calculated based on: the level indication value of the bitstream; the picture size or the maximum picture size of the bitstream; and an indicator value IND that represents whether or not the bitstream enables an output process. The calculation may be based on the value IND such that when IND indicates that the output process is enabled, the maximum number of picture storage buffers or the number of picture storage buffers is reduced by 1 compared to the case where the value IND indicates that the output process is disabled.

In some embodiments, an additional modification to the DPB allocation can be Implemented on top of the HEVC calculation of the DPB size described previously:
  if(PicSizeInSamplesY<=(MaxLumaPs>>2))
    MaxDpbSize=Min(4*maxDpbPicBuf, 16-output_process_enabled_flag)
  else if(PicSizeInSamplesY<=(MaxLumaPs>>1))
    MaxDpbSize=Min(2*maxDpbPicBuf, 16-output_process_enabled_flag)
  else if(PicSizeInSamplesY<=((3*MaxLumaPs)>>2))
    MaxDpbSize=Min((4*maxDpbPicBuf/3, 16-output_process_enabled_flag)
  else
    MaxDpbSize=maxDpbPicBuf-output_process_enabled_flag where MaxLumaPs is specified in Table A.6 and maxDpbPicBuf is equal to 6

In some embodiments, an entity may perform all or a subset of the following operations for determining a number of picture storage buffers or a number of decoded picture buffers for a current bitstream. First, an entity (e.g., a decoder, encoder, transcoder, computer program, or apparatus) can obtain a level indication value A for a current bitstream, wherein the level indication value A represents a set of restrictions imposed on the current bitstream that the current bitstream does not violate. Second, the entity can obtain a value B representing a picture size or a maximum picture size for the pictures in the current bitstream. Third, the entity can obtain an indicator value C that represents whether or not the bitstream enables an output process. One indicator value may specify that the bitstream does not enable the output process for any picture in the bitstream and another indicator value may specify that the bitstream may or may not enable the output process for a picture in the bitstream. Fourth, the entity can derive a maximum number of picture storage buffers needed to decode a bitstream based on the value A, B and C. Fifth, the entity may derive the maximum number of picture storage buffers needed to decode a bitstream based on the indicator value C such that if the indicator value specifies that the bitstream does not enable the output process for any picture in the bitstream a value of 1 is subtracted from the maximum number of picture storage buffers.

The number of picture storage buffers may be a maximum number of picture storage buffers necessary to decode a current bitstream. Similarly, a number of decoded picture buffers may be a maximum number of decoded picture buffers to decode a current bitstream.

In some embodiments, the output process can be considered to use a picture storage buffer. This means that the number of picture storage buffers used by a decoder at any point in time is equal to the sum of the number of pictures stored in the DPB and the number of picture storage buffers used for the output process. The pictures stored in the DPB can be specified by the syntax elements in the bitstream such as for example reference picture set (RPS) or reference picture list (RPL) related syntax elements. The picture stored in the DPB may be stored to be used for reference or stored waiting for output. The number of picture storage buffers used for the output process may be set equal to 1 if the output process is enabled for the bitstream or the current, picture, and set equal to 0 if the output process is disabled for the bitstream or the current picture.

In additional or alternative embodiments, the following italicized text can be added to the HEVC.

The HRD operates as follows:
  The HRD is initialized at decoding unit 0, with both the CPB and the DPB being set to be empty (the DPB fullness is set equal to 0). If output_process_enable_flag is equal to 1, the DPB fullness is set equal to 1.
  2. The value of NoOutputOfPriorPicsFlag derived for the decoder under test is applied for the HRD, such that when the value of NoOutputOfPriorPicsFlag is equal to 1, all picture storage buffers in the DPB are emptied without output of the pictures they contain, and the DPB fullness is set equal to 0. If output_process_enable_flag is equal to 1, the DPB fullness is set equal to 1.

In some embodiments, a decoder may perform all or a subset of the following operations for initializing a picture storage buffer count or a decoded picture buffer fullness when decoding a current bitstream. First, the decoder can obtain an indicator value C that represents whether or not the bitstream enables an output process. One indicator value may specify that the bitstream does not enable the output process for any picture in the bitstream and another indicator value may specify that the bitstream may or may not enable the output process for a picture in the bitstream. Second, if the indicator value C specifies that the bitstream does not enable the output process for any picture in the bitstream, the picture storage buffer count or the decoded picture buffer fullness can be initialized to a value equal to 1. Otherwise, the picture storage buffer count or the decoded picture buffer fullness can be initialized to a value equal to 0. Third, the decoder can decode the bitstream using the picture storage buffer count or the decoded picture buffer fullness, wherein the value of the picture storage buffer count or the value of the decoded picture buffer fullness does not exceed a maximum value during decoding.

The decoder may obtain the indicator value C fro a syntax element in the current bitstream.

In additional or alternative embodiments, the DPB fullness can be dynamically updated during decoding such that the DPB fullness is increased by 1 when an output process is started and decreased by 1 when that output process is completed. In this case, the output process may be considered instantaneous, such that the DPB fullness is increased by 1 when the output happens and then immediately decreased by 1.

In additional or alternative embodiments, the DPB fullness can be checked against a maximum fullness value minus 1 if the output process is considered using a picture storage buffer, and checked against the maximum fullness value as-is if the output process is not using a picture storage buffer.

A process may be considered using a picture storage buffer if the output process is of a specific type. Alternatively, a process may be considered using a picture storage buffer if any sample value of the output picture differs from the corresponding sample value in the decoded picture.

In some embodiments, a decoder may perform all or a subset of the following operations for decoding a current bitstream, First, the decoder can obtain an indicator value C that represents whether or not the bitstream enables an output process. One indicator value may specify that the bitstream does not enable the output process for any picture in, the bitstream and another indicator value may specify that the bitstream may or may not enable the output process for a picture in the bitstream. Second, the decoder can determine a value N from syntax elements in a header of the current picture and decrements the DPB fullness by the value N. Third, the decoder can decode the current picture and increments the DPB fullness by 1. Fourth, the decoder can determine to output a picture P that is stored in the DPB. Fifth, if the indicator value C specifies that the bitstream does not enable the output process for any picture in the bitstream, picture P can be output. Otherwise, the DPB fullness can be increased by 1, checked against a maximum fullness value, and decreased by 1. Further, the output process is executed and the resulting output picture is output.

In some embodiments, there are multiple output processes having a type indicating that the process uses a picture storage buffer. In this case, the value of output_process_enable_flag and the indicator value C in the previous embodiments do not represent one output process, but are both set equal to 0 if all of the multiple output processes are disabled. Otherwise, they are both set equal to 1.

For the case where the DPB fullness is dynamically updated, the DPB fullness can be increased and decreased by 1 either for each of the multiple output processes or once for all multiple output processes (which has the same effect).

In some embodiments, a method for decoding and outputting a picture from a bitstream, the method comprising: decoding an output process disable indicator value from the bitstream wherein the output process disable indicator value specifies that the output process is disabled; obtaining and parsing output process syntax elements from the bitstream; decoding a current picture from the bitstream; outputting the current picture as an output picture, wherein the output picture is identical to the decoded picture as a response to the output process disable indicator value specifying that the output process is disabled.

In additional or alternative embodiments, decoding an output process enable value, separate from the output process disable indicator value, from the bitstream wherein the output process enable value specifies that output process syntax elements are present in the bitstream.

In additional or alternative embodiments, the output process disable indicator value is decoded from a flag in a parameter set in the bitstream.

In additional or alternative embodiments, the output process enable value is decoded from a flag, different than the syntax element carrying the output process disable indicator value, in a parameter set in the bitstream.

In additional or alternative embodiments, the output process enable value and the output process disable indicator value are decoded from a single syntax element in a parameter set in the bitstream.

In additional or alternative embodiments, the parameter set is any of DPS, VPS, SPS, PPS or APS.

In additional or alternative embodiments, the output process is a film grain output process; the output process disable indicator value is a film grain output process disable value; the output process syntax elements are film grain syntax elements; and the output process enable value is a film grain enable value.

Figure 21:
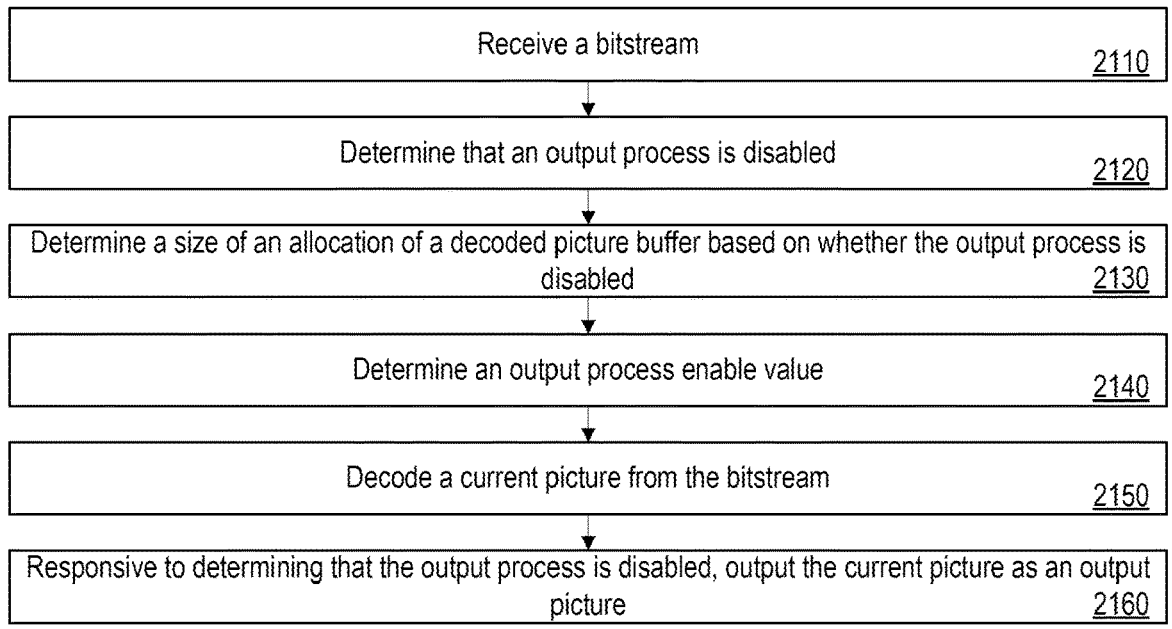
FIG. 21 is a flow chart illustrating operations of a decoder according to some embodiments of inventive concepts.

Operations of a decoder 1900 (implemented using the structure of FIG. 19) will now be discussed with reference to the flow chart of FIG. 21 according to some embodiments of inventive concepts. For example, modules may be stored in memory 1905 of FIG. 19, and these modules may provide instructions so that when the instructions of a module are executed by respective decoder processing circuitry 1903, processing circuitry 1903 performs respective operations of the flow chart.

At block 2110, processing circuitry 1903 receives, via network interface 1907, a bitstream. In some embodiments, the bitstream can include at least one output process syntax element for configuring an output process. In additional or alternative embodiments, the bitstream includes an output process disable indicator.

At block 2120, processing circuitry 1903 determines that an output process is disabled. In some embodiments, determining that the output process is disabled includes determining an output process disable indicator value associated with the output process disable indicator, the output process disable indicator value indicating whether the output process is disabled.

At block 2130, processing circuitry 1903 determines a size of an allocation of a decoded picture buffer based on whether the output process is disabled.

At block 2140, processing circuitry 1903 determines an output process enable value. In some embodiments, the output process enable value can be separate from the output process disable indicator value and can be determined from the bitstream. The output process enable value can specify whether at least one output process syntax element is present in the bitstream. The at least one output process syntax element can include instructions for configuring the output process.

At block 2150, processing circuitry 1903 decodes a current picture from the bitstream. In some embodiments, decoding the current picture from the bitstream includes parsing the at least one output process syntax element.

At block 2160, processing circuitry 1903, responsive to determining that the output process is disabled, output, via network interface 1907, the current picture as an output picture.

Various operations from the flow chart of FIG. 19 may be optional with respect to some embodiments of decoders and related methods. Regarding methods of example embodiment 1 (set forth below), for example, operations of blocks 2130 and 2140 of FIG. 21 may be optional.

Operations of a bitstream modification entity (e.g., decoder 1900, encoder 2000, or a transcoder as illustrated in FIG. 12B) will now be discussed with reference to the flow chart of FIG. 22 according to some embodiments of inventive concepts. For example, modules may be stored in memory 1905 of FIG. 19, and these modules may provide instructions so that when the instructions of a module are executed by respective decoder processing circuitry 1903, processing circuitry 1903 performs respective operations of the flow chart.

At block 2210, processing circuitry 1903 receives, via network interface 1907, an input bitstream. In some embodiments, the input bitstream can include an output process disable indicator.

At block 2220, processing circuitry 1903 generates an output bitstream from the input bitstream. In some embodiments, generating the output bitstream from the input bitstream includes copying or forwarding all coded data of the input bitstream except for the coded data representing an output process disable indicator.

At block 2230, processing circuitry 1903 sets an output process disable indicator value in the output bitstream.

At block 2240, processing circuitry 1903 determines the output process disable indicator value from the output bitstream.

At block 2250, processing circuitry 1903 determines a size of an allocation of a decoded picture buffer based on whether the output process is disabled.

At block 2270, processing circuitry 1903 decodes a current picture from the bitstream.

At block 2280, processing circuitry 1903, responsive to determining that the output process is disabled, output the current picture as an output picture.

At block 2290, processing circuitry 1903, outputs, via network interface 1907, the transcended bitstream.

Figure 22:
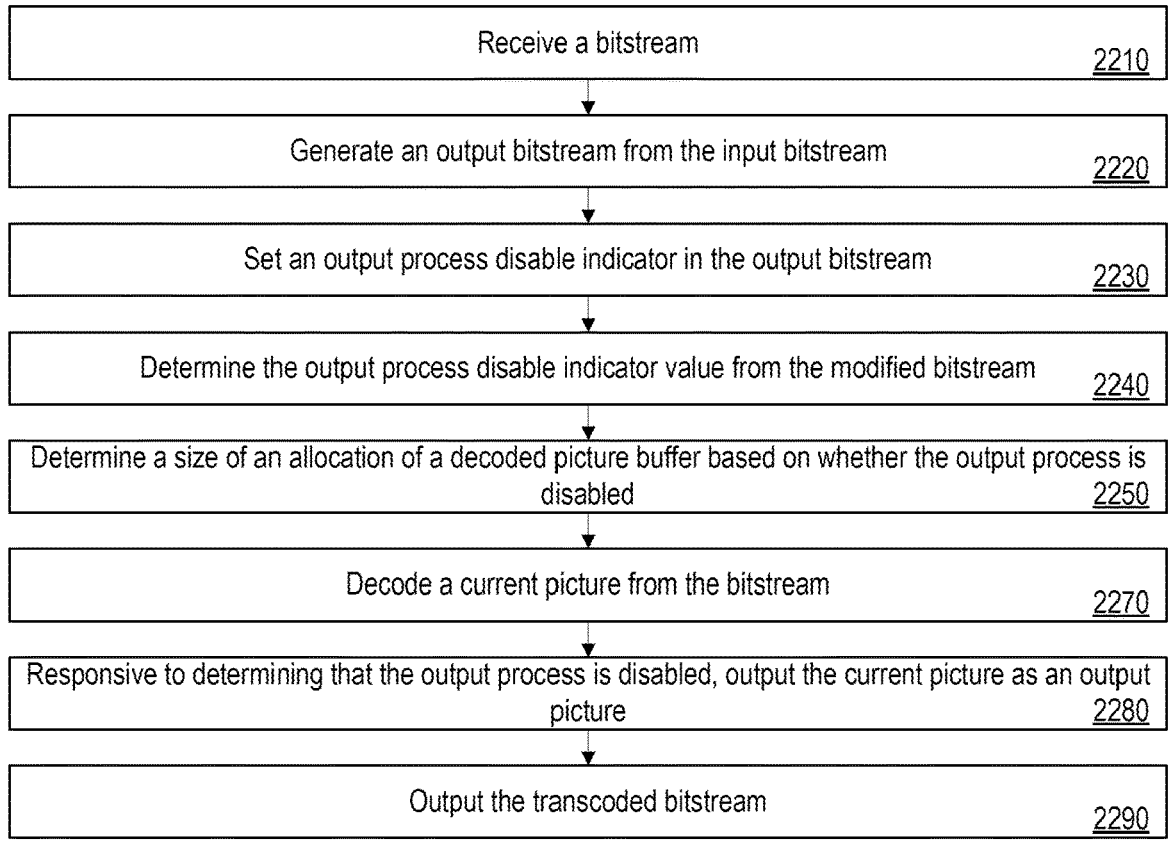
FIG. 22 is a flow chart illustrating operations of a bitstream modification entity according to some embodiments of inventive concepts.

Various operations from the flow chart of FIG. 22 may be optional with respect to some embodiments of bitstream modification entities and related methods. Regarding methods of example embodiment 15 (set forth below), for example, operations of blocks 2230, 2240, 2250, 2270, 2280, and 2290 of FIG. 22 may be optional.

Operations of a decoder 1900 (implemented using the structure of FIG. 19) will now be discussed with reference to the flow chart of FIG. 23 according to some embodiments of inventive concepts. For example, modules may be stored in memory 1905 of FIG. 19, and these modules may provide instructions so that when the instructions of a module are executed by respective decoder processing circuitry 1903, processing circuitry 1903 performs respective operations of the flow chart.

At block 2310, processing circuitry 1903 receives, via network interface 1907, an input bitstream.

At block 2320, processing circuitry 1903 determines whether an output process is disabled.

At block 2340, processing circuitry 1903 determines a size of an allocation for a decoded picture buffer based on whether the output process is disabled.

Figure 23:
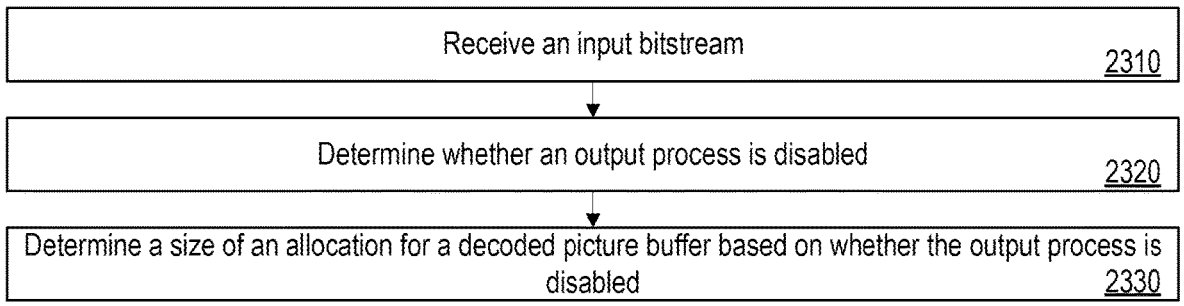
FIG. 23 is a flow chart illustrating other operations of a decoder according to some embodiments of inventive concepts.

Various operations from the flow chart of FIG. 23 may be optional with respect to some embodiments of bitstream modification entities and related methods.

Operations of an encoder 2000 (implemented using the structure of FIG. 20) will now be discussed with reference to the flow chart of FIG. 24 according to some embodiments of inventive concepts. For example, modules may be stored in memory 2005 of FIG. 20, and these modules may provide instructions so that when the instructions of a module are executed by respective encoder processing circuitry 2003, processing circuitry 2003 performs respective operations of the flow chart.

At block 2410, processing circuitry 2003 determines an output process disable indicator value.

At block 2420, processing circuitry 2003 determines an output process enable indicator value.

At block 2430, processing circuitry 2003 encodes the output process disable indicator value into the bitstream.

At block 2440, processing circuitry 2003 encodes the output process enable indicator value into the bitstream.

At block 2450, processing circuitry 2043 encodes the current picture into the bitstream.

Figure 24:
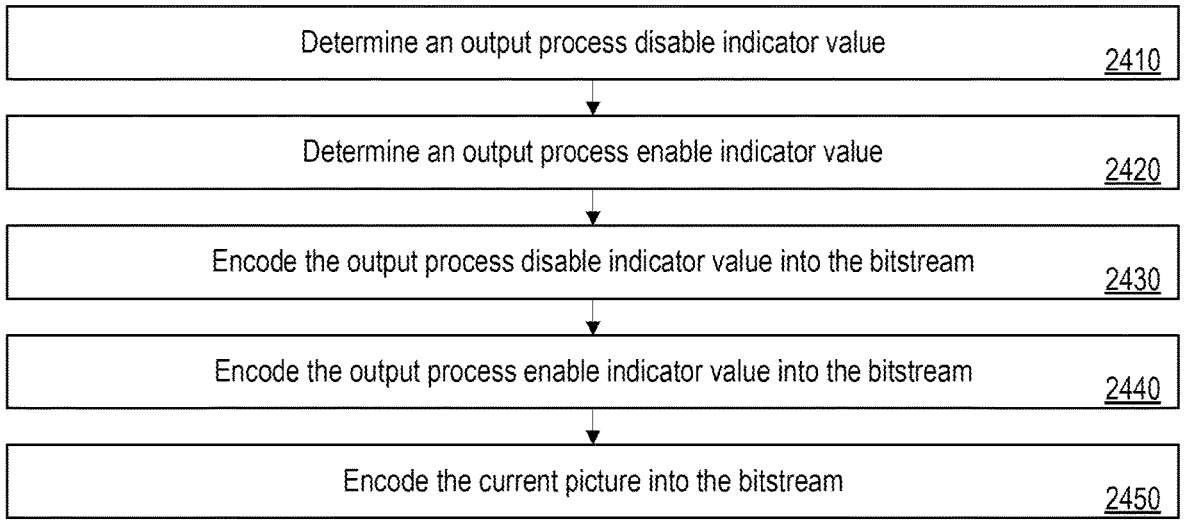
FIG. 24 is a flow chart illustrating operations of an encoder according to some embodiments of inventive concepts.

Various operations from the flow chart of FIG. 24 may be optional with respect to some embodiments of bitstream modification entities and related methods.

Example embodiments are discussed below.

Embodiment 1. A method performed by a decoder, the method comprising:
- receiving (2110) a bitstream, the bitstream comprising at least one output process syntax element for configuring an output process;
- determining (2120) that the output process is disabled;
- decoding (2150) a current picture from the bitstream; and
- responsive to determining that the output process is disabled, outputting (2160) the current picture as an output picture.

Embodiment 2. The method of Embodiment 1, wherein decoding the current picture from the bitstream comprises parsing the at least one output process syntax element.

Embodiment 3. The method of any of Embodiments 1-2, wherein receiving the bitstream further comprises receiving the bitstream comprising an output process disable indicator, wherein determining that the output process is disabled comprises determining an output process disable indicator value associated with the output process disable indicator, the output process disable indicator value indicating whether the output process is disabled.

Embodiment 4. The method of any of Embodiments 1-3, further comprising determining (2140) an output process enable value, separate from the output process disable indicator value, from the bitstream, the output process enable value specifying whether at least one output process syntax element is present in the bitstream, the at least one output process syntax element comprising instructions for configuring the output process.

Embodiment 5. The method of any of Embodiments 3-4, wherein determining the output process disable indicator value comprises decoding the output process disable indicator value from a flag in a parameter set in the bitstream.

Embodiment 6. The method of any of Embodiments 3-5, wherein determining the output process enable value comprises decoding the output process enable value from a flag in a parameter set in the bitstream.

Embodiment 7. The method of any of Embodiments 3-6, wherein the output process enable value and the output process disable indicator value are decoded from a single syntax element in a parameter set in the bitstream.

Embodiment 8. The method of any of Embodiments 5-7, wherein the parameter set comprises at least one of:
a decoding parameter set, DPS;
a video parameter set, VPS;
a sequence parameter set, SPS;
a picture parameter set, PPS; and
an adaptation parameter set, APS.

Embodiment 9. The method of any of Embodiments 1-8, wherein determining that the output process is disabled comprises determining whether an adaptation parameter set comprising the at least one output process syntax element is present in the input bitstream.

Embodiment 10. The method of Embodiment 9 wherein determining that the output process is disabled comprises:
deriving an aps_id value from an aps_id syntax element in a slice header or a picture header of the current picture; and
determining that no previously received adaptation parameter set of a type that indicates that the adaptation parameter set comprises the at least one output process syntax element has an adaptation parameter set 10 value that is equal to the aps_id value.

Embodiment 1 The method of any of Embodiments 1-10, wherein determining that the output process is disabled comprises receiving the output process disable indicator value by external means.

Embodiment 12. The method of any of Embodiments 1-11, wherein the output process comprises at least one of:
applying film grain to the current picture:
applying a color transform and/or color component value scaling to the current picture;
applying a projection mapping or inverse projection mapping to the current picture;
performing a region-wise packing or region-wise unpacking of the current picture by a set of region-wise operations;
cropping the current picture;
converting the current picture to a different Dolor format;
converting the current picture to a different chroma format;
scaling or resampling the current picture;
converting the current picture to a different sample aspect ratio;
converting two decoded fields of the current picture to an interlaced picture;
applying frame packing to or removing frame packing from the current picture;
extracting one or more subpictures from the current picture;
applying post filtering; and
applying overlays.

Embodiment 13. The method of any of Embodiments 1-1 wherein the output process comprises a film grain output process,
wherein the value of the output process disable indicator is a film grain output process disable value,
wherein the at least one output process syntax element is a film grain syntax element, and
wherein the output process enable value is a film grain enable value.

Embodiment 14. The method of any of Embodiments 1-13, further comprising responsive to determining that the output process is disabled, determining (2130) a size of an allocation for a decoded picture buffer, DPB, based on whether the output process is disabled.

Embodiment 15. A method performed by a bitstream modification entity, the method comprising:
receiving (2210) an input bitstream comprising an output process disable indicator;
generating (2220) an output bitstream from the input bitstream by copying or forwarding all coded data of the input bitstream except for the coded data representing an output process disable indicator; and
setting (2230) the output process disable indicator in the output bitstream to a value that indicates that an output process is disabled,
wherein at least one output process syntax element is present the input bitstream and copied or forwarded to the output bitstream.

Embodiment 16. The method of Embodiment 15, further comprising:
decoding (2270) a current picture from the output bitstream;
encoding (2280) the current picture into a transcoded bitstream; and
outputting (2290) the transcoded bitstream.

Embodiment 17. The method of any of Embodiments 15-16, wherein generating the output bitstream from the input bitstream further comprises copying or forwarding an output process enable value, separate from the output process disable indicator value, from the input bitstream to the output bitstream, wherein the output process enable value specifies that at least one output process syntax element is present in the modified bitstream.

Embodiment 18. The method of Embodiment 17, wherein copying or forwarding the output process enable value comprises copying or forwarding a flag in a parameter set in the input bitstream.

Embodiment 19. The method of any of Embodiments 15-18, wherein copying or forwarding the at least one output process syntax element comprises copying or forwarding the at least one output process syntax element from a parameter set in the input bitstream.

Embodiment 20. The method of any of Embodiments 15-19, the method further comprising determining the output process disable indicator value by decoding a flag in a parameter set in the output or input bitstream.

Embodiment 21. The method of any of Embodiments 18-20, wherein the output process enable value and the output process disable indicator value are decoded from a single syntax element in a parameter set in the output or input bitstream.

Embodiment 22. The method of any of Embodiments 18-21, wherein the parameter set comprises at least one of:
a decoding parameter set, DPS;
a video parameter set, VPS;
a sequence parameter set, SPS;
a picture parameter set, PPS; and
an adaptation parameter set, APS.

Embodiment 23. The method of any of Embodiments 15-22, wherein the input bitstream comprises an APS comprising the at least one output process syntax element,
wherein setting the output process disable indicator in the output bitstream comprising removing the APS,
the method further comprising determining (2240) the output process disable indicator value from the output bitstream by determining that the APS is absent from the modified bitstream.

Embodiment 24. The method of Embodiment 23 wherein determining the output process disable indicator value further comprises:
deriving an aps_id value from an aps_id syntax element in a slice header or a picture header of the current picture; and
determining that no previously received adaptation parameter set of a type that indicates that the adaptation parameter set comprises the at least one output process syntax element has an adaptation parameter set ID value that is equal to the aps_id value.

Embodiment 25. The method of any of Embodiments 23-24, wherein setting the output process disable indicator value in the output bitstream comprising removing the APS is responsive to receiving instructions to disable the output process from the input bitstream or by external means.

Embodiment 26. The method of any of Embodiments 15-25, wherein the output process comprises at least one of:
applying film grain to the current picture:
applying a color transform and/or color component value scaling to the current picture;
applying a projection mapping or inverse projection mapping to the current picture;
performing a region-wise packing or region-wise unpacking of the current picture by a set of region-wise operations;
cropping the current picture;
converting the current picture to a different color format;
converting the current picture to a different chroma format;
scaling or resampling the current picture;
converting the current picture to a different sample aspect ratio;
converting two decoded fields of the current picture to an interlaced picture;
applying frame packing to or removing frame packing from the current picture;
extracting one or more subpictures from the current picture;
applying post filtering; and
applying overlays.

Embodiment 27. The method of any of Embodiments 15-26, wherein the output process comprises a film grain output process,
wherein the value of the output process disable indicator is a film grain output process disable value,
wherein the at least one output process syntax element is a film grain syntax element, and
wherein the output process enable value is a film grain enable value.

Embodiment 28. The method of any of Embodiments 15-27, further comprising responsive to determining that the output process is disabled, determining (2250) a size of an allocation for a decoded picture buffer, DPB, based on whether the output process is disabled.

Embodiment 29. The method of any of Embodiments 15-28, wherein the bitstream modification entity is a transcoder.

Embodiment 30. A method performed by a decoder, the method comprising:
receiving (2310) an input bitstream;
determining (2320) whether an output process is disabled;
determining (2320) a size of an allocation for a decoded picture buffer, DPB, based on whether the output process is disabled.

Embodiment 31. The method of Embodiment 30, wherein determining whether the output process is disabled comprises determining an output process enable value from the input bitstream, Embodiment 32. The method of any of Embodiments 30-31, wherein determining whether the output process is disabled comprises determining an output process disable indicator value.

Embodiment 33. The method of Embodiment 32, wherein determining the output process disable indicator value comprises determining the output process disable indicator value from the input bitstream.

Embodiment 34. The method of Embodiment 32, wherein determining the output process disable indicator value comprises determining the output process disable indicator value by external means, Embodiment 35. The method of any of Embodiments 30-34, wherein determining the size of the allocation of the DPB based on whether the output process is disabled comprises, responsive to determining that the output process is disabled, reducing the size of the allocation of the DPB by one.

Embodiment 36. The method of any of Embodiments 30-34, wherein determining the size of the allocation of the DPB based on whether the output process is disabled comprises, responsive to determining that the output process is enabled, increasing the size of the allocation of the DPB by one.

Embodiment 37. The method of any of Embodiments 30-36, wherein the output process comprises at least one of:
applying film grain to the current picture;
applying a color transform and/or color component value scaling to the current picture;
applying a projection mapping or inverse projection mapping to the current picture;
performing a region-wise packing or region-wise unpacking of the current picture by a set of region-wise operations;
cropping the current picture;
converting the current picture to a different color format;

converting the current picture to a different chroma format;
scaling or resampling the current picture;
converting the current picture to a different sample aspect ratio;
converting two decoded fields of the current picture to an interlaced picture;
applying frame packing to or removing frame packing from the current picture;
extracting one or more subpictures from the current picture;
applying post filtering; and
applying overlays.

Embodiment 38. A method performed by an encoder for encoding a current picture into a bitstream, the method comprising;
determining (2410) an output process disable indicator value, the output process disable indicator value indicating whether an output process is disabled;
determining (2420) an output process enable indicator value, separate from the output process disable indicator value, the output process enable value specifying whether at least one output process syntax element is present in the bitstream wherein the at least one output process syntax element comprising instructions for configuring the output process;
encoding (2430) the output process disable indicator value into the bitstream;
encoding (2440) the output process enable indicator value into the bitstream; and
encoding (2450) the current picture into the bitstream.

Embodiment 39. The method of Embodiment 38 wherein encoding the output process disable indicator value into the bitstream comprises encoding the output process disable indicator value as a flag in a parameter set in the bitstream.

Embodiment 40. The method of any of Embodiments 38-39 wherein encoding the output process enable indicator value into the bitstream comprises encoding the output process enable indicator value as a flag in a parameter set in the bitstream.

Embodiment 41. The method of any of Embodiments 39-40, wherein the parameter set comprises at least one of:
a decoding parameter set, DPS;
a video parameter set, VPS;
a sequence parameter set, SPS;
a picture parameter set, PPS; and
an adaptation parameter set, APS.

Embodiment 42. The method of any of Embodiments 38-41, wherein the output process comprises at least one of:
applying film grain to the current picture;
applying a color transform and/or color component value scaling to the current picture;
applying a projection mapping or inverse projection mapping to the current picture;
performing a region-wise packing or region-wise unpacking of the current picture by a set of region-wise operations;
cropping the current picture;
converting the current picture to a different color format;
converting the current picture to a different chroma format;
scaling or resampling the current picture;
converting the current picture to a different sample aspect ratio;
converting two decoded fields of the current picture to an interlaced picture;
applying frame packing to or removing frame packing from the current picture; and
extracting one or more subpictures from the current picture;
applying post filtering: and
applying overlays.

Embodiment 43. The method of any of Embodiments 38-42, further comprising determining (2130) a size of an allocation for a decoded picture buffer, DPB, based on the determined output process disable indicator value.

Embodiment 44. A decoder (1900) comprising:
processing circuitry (1903): and
memory (1905) coupled with the processing circuitry, wherein the memory includes instructions that when executed by the processing circuitry causes the decoder to perform operations comprising:
receiving (2110) a bitstream, the bitstream comprising at least one output process syntax element for configuring an output process;
determining (2120) that the output process is disabled;
decoding (2150) a current picture from the bitstream; and
responsive to determining that the output process is disabled, outputting (2160) the current picture as an output picture.

Embodiment 45. The decoder of Embodiment 44, the operations further comprising any of the operations of Embodiments 2-14.

Embodiment 46, A bitstream modification entity (1900, 2000) comprising:
processing circuitry (1903, 2003); and
memory (1905, 2005) coupled with the processing circuitry, wherein the memory includes instructions that when executed by the processing circuitry causes the bitstream modification entity to perform operations comprising:
receiving (2210) an input bitstream comprising an output process disable indicator;
generating (2220) an output bitstream from the input bitstream by copying or forwarding all coded data of the input bitstream except for the coded data representing an output process disable indicator; and
setting (2230) the output process disable indicator in the output bitstream to a value that indicates that an output process is disabled,
wherein at least one output process syntax element is present in the input bitstream and copied or forwarded to the output bitstream.

Embodiment 47. The bitstream modification entity of Embodiment 46, the operations further comprising any of the operations of Embodiments 16-29.

Embodiment 48. A decoder (1900) comprising:
processing circuitry (1903); and
memory (1905) coupled with the processing circuitry, wherein the memory includes instructions that when executed by the processing circuitry causes the decoder to perform operations comprising:
receiving (2310) an input bitstream;
determining (2320) whether an output process is disabled; and determining (2320) a size of an allocation for a decoded picture buffer, APB, based on whether the output process is disabled.

Embodiment 49. The decoder of Embodiment 48, the operations further comprising any of the operations of Embodiments 31-37.

Embodiment 50. An encoder (2000) comprising:
processing circuitry (2003); and
memory (2005) coupled with the processing circuitry, wherein the memory includes instructions that when executed by the processing circuitry causes the encoder to perform operations comprising:
determining (2410) an output process disable indicator value, the output process disable indicator value indicating whether an output process is disabled;
determining (2420) an output process enable indicator value, separate from the output process disable indicator value, the output process enable value specifying whether at least one output process syntax element is present in the bitstream wherein the at least one output process syntax element comprising instructions for configuring the output process;
encoding (2430) the output process disable indicator value into the bitstream;
encoding (2440) the output process enable indicator value into the bitstream; and
encoding (2450) the current picture into the bitstream.

Embodiment 51. The encoder of Embodiment 50, the operations further comprising any of the operations of Embodiments 39-43.

Embodiment 52. A computer program comprising program code to be executed by processing circuitry (1903) of a decoder (1900), whereby execution of the program code causes the decoder to perform operations comprising:
receiving (2110) a bitstream, the bitstream comprising at least one output process syntax element for configuring an output process;
determining (2120) that the output process is disabled;
decoding (2150) a current picture from the bitstream; and
responsive to determining that the output process is disabled, outputting (2160) the current picture as an output picture.

Embodiment 53. The computer program of Embodiment 52 the operations further comprising any of the operations of Embodiments 2-14.

Embodiment 54. A computer program comprising program code to be executed by processing circuitry (1903, 2003) of a bitstream modification entity (1900, 2000), whereby execution of the program code causes the bitstream modification entity to perform operations comprising:
receiving (2210) an input bitstream comprising an output process disable indicator;
generating (2220) an output bitstream from the input bitstream by copying or forwarding all coded data of the input bitstream except for the coded data representing an output process disable indicator; and
setting (2230) the output process disable indicator in the output bitstream to a value that indicates that an output process is disabled,
wherein at least one output process syntax element is present in the input bitstream and copied or forwarded to the output bitstream.

Embodiment 55. The computer program of Embodiment 54, the operations further comprising any of the operations of Embodiments 16-29.

Embodiment 56. A computer program comprising program code to be executed by processing circuitry (1903) of a decoder (1900), whereby execution of the program code causes the decoder to perform operations comprising:
receiving (2310) an input bitstream;
determining (2320) whether an output process is disabled; and
determining (2320) a size of an allocation for a decoded picture buffer, DPB, based on whether the output process is disabled.

Embodiment 57. The computer program of Embodiment 56, the operations further comprising any of the operations of Embodiments 31-37.

Embodiment 58. A computer program comprising program code to be executed by processing circuitry (2003) of an encoder (2000), whereby execution of the program code causes the encoder to perform operations comprising:
determining (2410) an output process disable indicator value, the output process disable indicator value indicating whether an output process is disabled;
determining (2420) an output process enable indicator value, separate from the output process disable indicator value, the output process enable value specifying whether at least one output process syntax element is present in the bitstream wherein the at least one output process syntax element comprising instructions for configuring the output process;
encoding (2430) the output process disable indicator value into the bitstream;
encoding (2440) the output process enable indicator value into the bitstream; and
encoding (2450) the current picture into the bitstream.

Embodiment 59, The computer program of Embodiment 58, the operations further comprising any of the operations of Embodiments 39-43.

Embodiment 60. A computer program product comprising a non-transitory storage medium including program code to be executed by processing circuitry (1903) of a decoder (1900), whereby execution of the program code causes the decoder to perform operations comprising:
receiving (2110) a bitstream, the bitstream comprising at least one output process syntax element for configuring an output process;
determining (2120) that the output process is disabled;
decoding (2150) a current picture from the bitstream; and
responsive to determining that the output process is disabled, outputting (2160) the current picture as an output picture.

Embodiment 61. The computer program product of Embodiment 60, the operations further comprising any of the operations of Embodiments 2-14.

Embodiment 62. A computer program product comprising a non transitory storage medium including program code to be executed by processing circuitry (1903, 2003) of a bitstream modification entity (1900, 2000), whereby execution of the program code causes the bitstream modification entity to perform operations comprising:
  receiving (2210) an input bitstream comprising an output process disable indicator;
  generating (2220) an output bitstream from the input bitstream by copying or forwarding all coded data of the input bitstream except for the coded data representing an output process disable indicator; and
  setting (2230) the output process disable indicator in the output bitstream to a value that indicates that an output process is disabled,
  wherein at least one output process syntax element s present in the input bitstream and copied or forwarded to the output bitstream.

Embodiment 63. The computer program product of Embodiment 62, the operations further comprising any of, the operations of Embodiments 16-29, Embodiment 64. A computer program product comprising a non-transitory storage medium including program code to be executed by processing circuitry (1903) of a decoder (1900), whereby execution of the program code causes the decoder to perform operations comprising:
  receiving (2310) an input bitstream;
  determining (2320) whether an output process is disabled; and
  determining (2320) a size of an allocation for a decoded picture buffer, DPB, based on whether the output process is disabled.

Embodiment 65. The computer program product of Embodiment 64, the operations further comprising any of the operations of Embodiments 31-37, Embodiment 66. A computer program product comprising a non-transitory storage medium including program code to be executed by processing circuitry (2003) of an encoder (2000), whereby execution of the program code causes the encoder to perform operations comprising:
  determining (2410) an output process disable indicator value, the output process disable indicator value indicating whether an output process is disabled;
  determining (2420) an output process enable indicator value, separate from the output process disable indicator value, the output process enable value specifying whether at least one output process syntax element is present in the bitstream wherein the at least one output process syntax element comprising instructions for configuring the output process;
  encoding (2430) the output process disable indicator value into the bitstream;
  encoding (2440) the output process enable indicator value into the bitstream; and
  encoding (2450) the current picture into the bitstream.

Embodiment 67. The computer program product of Embodiment 66, the operations further comprising any of the operations of Embodiments 39-43.

Embodiment 68, A non-transitory computer-readable medium having instructions stored therein that are executable by processing circuitry (1903) to cause a decoder (1900) to perform operations comprising:
  receiving (2110) a bitstream, the bitstream comprising at least one output process syntax element for configuring an output process;
  determining (2120) that the output process is disabled;
  decoding (2150) a current picture from the bitstream; and
  responsive to determining that the output process is disabled, outputting (2160) the current picture as an output picture.

Embodiment 69, The non-transitory computer-readable medium of Embodiment 68, the operations further comprising any of the operations of Embodiments 2-14.

Embodiment 70. A non-transitory computer-readable medium having instructions stored therein that are executable by processing circuitry (1903, 2003) to cause a bitstream modification entity (1900, 2000) to perform operations comprising:
  receiving (2210) an input bitstream comprising an output process disable indicator;
  generating (2220) an output bitstream from the input bitstream by copying or forwarding all coded data of the input bitstream except for the coded data representing an output process disable indicator; and
  setting (2230) the output process disable indicator in the output bitstream to a value that indicates that an output process is disabled,
  wherein at least one output process syntax element is present n the input bitstream and copied or forwarded to the output bitstream.

Embodiment 71. The non-transitory computer-readable medium of Embodiment 70, the operations further comprising any of the operations of Embodiments 16-29.

Embodiment 72. A non-transitory computer-readable medium having instructions stored therein that are executable by processing circuitry (1903) to cause a decoder (1900) to perform operations comprising:
  receiving (2310) an input bitstream;
  determining (2320) whether an output process is disabled; and
  determining (2320) a size of an allocation for a decoded picture buffer, DPB, based on whether the output process is disabled.

Embodiment 73. The non-transitory computer-readable medium of Embodiment 72, the operations further comprising any of the operations of Embodiments 31-37.

Embodiment 74. A non-transitory computer-readable medium having instructions stored therein that are executable by processing circuitry (2003) to cause an encoder (2000) to perform operations comprising:
  determining (2410) an output process disable indicator value, the output process disable indicator value indicating whether an output process is disabled;
  determining (2420) an output process enable indicator value, separate from the output process disable indicator value, the output process enable value specifying whether at least one output process syntax element is present in the bitstream wherein the at least one output process syntax element comprising instructions for configuring the output process;
  encoding (2430) the output process disable indicator value into the bitstream;
  encoding (2440) the output process enable indicator value into the bitstream; and
  encoding (2450) the current picture into the bitstream.

Embodiment 75. The non-transitory computer-readable medium of Embodiment 74, the operations further comprising any of the operations of Embodiments 39-4.

Further definitions and embodiments are discussed below.

In the above-description of various embodiments of present inventive concepts, it is to be understood that the terminology used herein is for the purpose of describing particular embodiments only and is not intended to be limiting of present inventive concepts, Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized, or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "I") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method performed by a decoder, the method comprising:
   receiving a bitstream, the bitstream comprising at least one output process syntax element for configuring an output process, wherein the output process is configured to modify a decoded picture to generate an output picture;
   determining that the output process is disabled;
   parsing the at least one output process syntax element;
   decoding a current picture from the bitstream; and
   responsive to determining that the output process is disabled, outputting the decoded current picture as an output picture.

2. The method of claim 1, wherein receiving the bitstream further comprises receiving the bitstream comprising an output process disable indicator,
   wherein determining that the output process is disabled comprises determining an output process disable indicator value associated with the output process disable indicator, the output process disable indicator value indicating whether the output process is disabled.

3. The method of claim 1, further comprising determining from the bitstream an output process enable value, separate from the output process disable indicator value, the output process enable value specifying whether at least one output process syntax element is present in the bitstream, the at least one output process syntax element comprising instructions for configuring the output process.

4. The method of claim 2, wherein determining the output process disable indicator value comprises decoding the output process disable indicator value from a first flag in a parameter set in the bitstream, and
   wherein determining the output process enable value comprises decoding the output process enable value from a second flag, different from the first flag, in a parameter set in the bitstream.

5. The method of claim 1, wherein determining that the output process is disabled comprises:
   determining whether an adaptation parameter set comprising the at least one output process syntax element is present in an input bitstream;
   deriving an aps_id value from an aps_id syntax element in a slice header or a picture header of the current picture; and
   determining that no previously received adaptation parameter set of a type that indicates that the adaptation parameter set comprises the at least one output process syntax element has an adaptation parameter set ID value that is equal to the aps_id value.

6. The method of claim 1, wherein the output process comprises at least one of:
   applying film grain to the decoded current picture;
   applying a color transform and/or color component value scaling to the decoded current picture;
   applying a projection mapping or inverse projection mapping to the decoded current picture;
   performing a region-wise packing or region-wise unpacking of the decoded current picture by a set of region-wise operations;
   converting the decoded current picture to a different color format;
   converting the decoded current picture to a different chroma format;
   scaling or resampling the decoded current picture;
   converting the decoded current picture to a different sample aspect ratio;
   converting two decoded fields of the decoded current picture to an interlaced picture;
   applying frame packing to or removing frame packing from the decoded current picture;
   extracting one or more subpictures from the decoded current picture;
   applying post filtering;
   applying overlays; and
   a film grain output process,
      wherein the value of the output process disable indicator is a film grain output process disable value,
      wherein the at least one output process syntax element is a film grain syntax element, and
      wherein the output process enable value is a film grain enable value.

7. The method of claim 1, further comprising responsive to determining that the output process is disabled, determining a size of an allocation for a decoded picture buffer, DPB, based on whether the output process is disabled.

8. A method performed by a decoder, the method comprising:
   receiving an input bitstream;
   determining whether an output process is disabled;
   determining a size of an allocation for a decoded picture buffer (DPB) based on whether the output process is disabled.

9. The method of claim 8, wherein determining whether the output process is disabled comprises determining an output process enable value from the input bitstream or an output process disable indicator value from the input bitstream.

10. The method of claim 8, wherein determining whether the output process is disabled comprises determining an output process disable indicator value by external means.

11. The method of claim 8, wherein determining the size of the allocation of the DPB based on whether the output process is disabled comprises, responsive to determining that the output process is disabled, reducing the size of the allocation of the DPB by one.

12. The method of claim 8, wherein determining the size of the allocation of the DPB based on whether the output process is disabled comprises, responsive to determining that the output process is enabled, increasing the size of the allocation of the DPB by one.

13. The method of claim 8, wherein the output process comprises at least one of:
   applying film grain to a decoded current picture;
   applying a color transform and/or color component value scaling to the decoded current picture;
   applying a projection mapping or inverse projection mapping to the decoded current picture;
   performing a region-wise packing or region-wise unpacking of the decoded current picture by a set of region-wise operations;
   converting the decoded current picture to a different color format;
   converting the decoded current picture to a different chroma format;
   scaling or resampling the decoded current picture;
   converting the decoded current picture to a different sample aspect ratio;
   converting two decoded fields of the decoded current picture to an interlaced picture;
   applying frame packing to or removing frame packing from the decoded current picture;
   extracting one or more subpictures from the decoded current picture;

applying post filtering; and applying overlays.

14. A method performed by an encoder for encoding a current picture into a bitstream, the method comprising:

determining an output process disable indicator value, the output process disable indicator value indicating whether an output process is disabled;

determining an output process enable indicator value, separate from the output process disable indicator value, the output process enable value specifying whether at least one output process syntax element is present in the bitstream, wherein the at least one output process syntax element comprising instructions for configuring the output process;

encoding the output process disable indicator value into the bitstream;

encoding the output process enable indicator value into the bitstream; and encoding the current picture into the bitstream.

15. The method of claim 14, wherein encoding the output process disable indicator value into the bitstream comprises encoding the output process disable indicator value as a first flag in a parameter set in the bitstream, and wherein encoding the output process enable indicator value into the bitstream comprises encoding the output process enable indicator value as a second flag, different than the first flag, in a parameter set in the bitstream.

16. The method of claim 14, wherein the output process comprises at least one of:

applying film grain to the decoded current picture;

applying a color transform and/or color component value scaling to the decoded current picture;

applying a projection mapping or inverse projection mapping to the decoded current picture;

performing a region-wise packing or region-wise unpacking of the decoded current picture by a set of region-wise operations;

converting the decoded current picture to a different color format;

converting the decoded current picture to a different chroma format;

scaling or resampling the decoded current picture;

converting the decoded current picture to a different sample aspect ratio;

converting two decoded fields of the decoded current picture to an interlaced picture;

applying frame packing to or removing frame packing from the decoded current picture; and extracting one or more subpictures from the decoded current picture;

applying post filtering; and applying overlays.

17. The method of claim 14, further comprising determining a size of an allocation for a decoded picture buffer, DPB, based on the determined output process disable indicator value.

18. A decoder comprising:

processing circuitry; and memory coupled with the processing circuitry, wherein the memory includes instructions that when executed by the processing circuitry causes the decoder to perform operations comprising the operations of claim 1.

19. A decoder comprising:

processing circuitry; and memory coupled with the processing circuitry, wherein the memory includes instructions that when executed by the processing circuitry causes the decoder to perform operations comprising the operations of claim 8.

20. An encoder comprising:

processing circuitry; and memory coupled with the processing circuitry, wherein the memory includes instructions that when executed by the processing circuitry causes the encoder to perform operations comprising the operations of claim 14.

* * * * *